United States Patent
He et al.

(10) Patent No.: US 9,652,034 B2
(45) Date of Patent: May 16, 2017

(54) USER INTERFACE BASED ON OPTICAL SENSING AND TRACKING OF USER'S EYE MOVEMENT AND POSITION

(71) Applicant: Shenzhen Huiding Technology Co., Ltd., Shenzhen (CN)

(72) Inventors: Yi He, San Diego, CA (US); Bo Pi, Carlsbad, CA (US)

(73) Assignee: Shenzhen Huiding Technology Co., Ltd., Shenzhen (CN)

(*) Notice: Subject to any disclaimer, the term of this patent is extended or adjusted under 35 U.S.C. 154(b) by 0 days.

(21) Appl. No.: 14/484,099

(22) Filed: Sep. 11, 2014

(65) Prior Publication Data

US 2015/0070273 A1    Mar. 12, 2015

Related U.S. Application Data

(60) Provisional application No. 61/876,726, filed on Sep. 11, 2013.

(51) Int. Cl.
*G06F 3/01* (2006.01)
*G06K 9/00* (2006.01)

(52) U.S. Cl.
CPC ......... *G06F 3/013* (2013.01); *G06K 9/00604* (2013.01)

(58) Field of Classification Search
CPC ............................ G06F 3/013; G06K 9/00604
See application file for complete search history.

(56) References Cited

U.S. PATENT DOCUMENTS

| | | | |
|---|---|---|---|
| 3,864,030 A | 2/1975 | Cornsweet | |
| 5,610,673 A * | 3/1997 | Rafal | G06K 9/00604 351/209 |
| 5,956,124 A | 9/1999 | Dan | |
| 6,373,961 B1 | 4/2002 | Richardson et al. | |
| 6,542,624 B1 | 4/2003 | Oda | |
| 6,634,749 B1 | 10/2003 | Morrison et al. | |
| 7,380,938 B2 | 6/2008 | Chmielewski, Jr. et al. | |

(Continued)

FOREIGN PATENT DOCUMENTS

| | | |
|---|---|---|
| WO | 2015/070182 A2 | 5/2015 |
| WO | 2015/081325 A1 | 6/2015 |

OTHER PUBLICATIONS

International Search Report and Written Opinion mailed on Feb. 25, 2015 for International Application No. PCT/US2014/055243, filed on Sep. 11, 2014 (10 pages).

(Continued)

*Primary Examiner* — Nalini Mummalaneni
*Assistant Examiner* — Robert Michaud
(74) *Attorney, Agent, or Firm* — Perkins Coie LLP

(57) ABSTRACT

Methods, systems, and devices are disclosed for optical sensing and tracking of eye movement. In one aspect, a method for tracking the movement of an eye includes emitting light toward an eye of a user using multiple light sources substantially equally spaced from a photodetector module of a device, receiving at the photodetector module at least a partial retroreflection of the light emitted by each of the multiple light sources retroreflected from the eye, and determining a positional parameter of the eye based on differential values of the at least partial retroreflections corresponding to the multiple light sources.

61 Claims, 17 Drawing Sheets

(56) References Cited

U.S. PATENT DOCUMENTS

| | | | |
|---|---|---|---|
| 8,878,773 B1* | 11/2014 | Bozarth | G06K 9/00604 345/156 |
| 9,323,325 B2 | 4/2016 | Perez et al. | |
| 2002/0041259 A1 | 4/2002 | Lewis et al. | |
| 2002/0093645 A1* | 7/2002 | Heacock | A61B 3/152 356/138 |
| 2002/0093654 A1* | 7/2002 | Lieberman | G01N 21/21 356/369 |
| 2003/0038754 A1 | 2/2003 | Goldstein et al. | |
| 2004/0032952 A1 | 2/2004 | Pinto et al. | |
| 2004/0170304 A1* | 9/2004 | Haven | A61B 3/113 382/115 |
| 2005/0073136 A1 | 4/2005 | Larsson et al. | |
| 2006/0110008 A1* | 5/2006 | Vertegaal | G06K 9/00604 382/103 |
| 2006/0256083 A1 | 11/2006 | Rosenberg | |
| 2007/0159599 A1 | 7/2007 | Yamada | |
| 2008/0044188 A1 | 2/2008 | Kagawa et al. | |
| 2009/0046249 A1 | 2/2009 | Northcott et al. | |
| 2009/0046899 A1* | 2/2009 | Northcott | G06K 9/00604 382/117 |
| 2009/0141339 A1* | 6/2009 | Yurlov | G02B 26/06 359/318 |
| 2009/0192961 A1 | 7/2009 | Fithian et al. | |
| 2011/0069277 A1 | 3/2011 | Blixt et al. | |
| 2011/0170060 A1* | 7/2011 | Gordon | A61B 3/156 351/206 |
| 2011/0182472 A1 | 7/2011 | Hansen | |
| 2012/0105486 A1 | 5/2012 | Lankford et al. | |
| 2012/0256967 A1 | 10/2012 | Baldwin et al. | |
| 2013/0077049 A1 | 3/2013 | Bohn | |
| 2013/0094712 A1 | 4/2013 | Said | |
| 2013/0176533 A1 | 7/2013 | Raffle et al. | |
| 2013/0188834 A1* | 7/2013 | Ebisawa | A61B 3/113 382/103 |
| 2014/0075349 A1 | 3/2014 | Yun et al. | |
| 2014/0354514 A1 | 12/2014 | Aronsson | |
| 2014/0361957 A1 | 12/2014 | Hua et al. | |
| 2015/0145777 A1* | 5/2015 | He | G06K 9/0061 345/158 |
| 2015/0199006 A1 | 7/2015 | He et al. | |

OTHER PUBLICATIONS

International Search Report and Written Opinion mailed on Feb. 19, 2015 for International Application No. PCT/US2014/064884, filed on Nov. 10, 2014 (12 pages).

International Search Report and Written Opinion mailed on Apr. 16, 2015 for International Application No. PCT/US2014/067827, filed on Nov. 28, 2014 (10 pages).

* cited by examiner

Eye tracker implemented on a smartphone

Eye tracker implemented on a computer monitor or TV.

Eye tracker can also be implemented on a head mount display (HUD) device

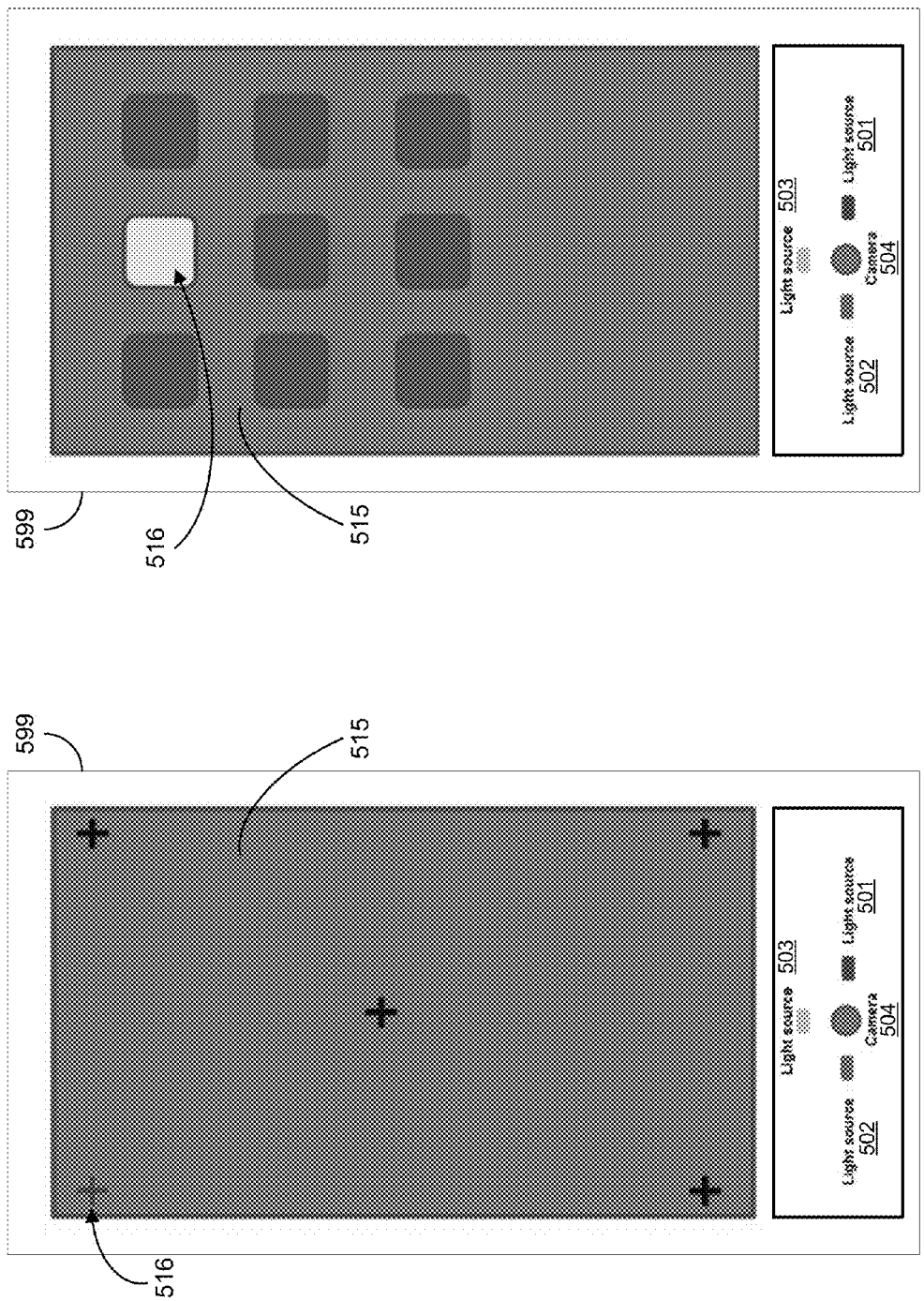

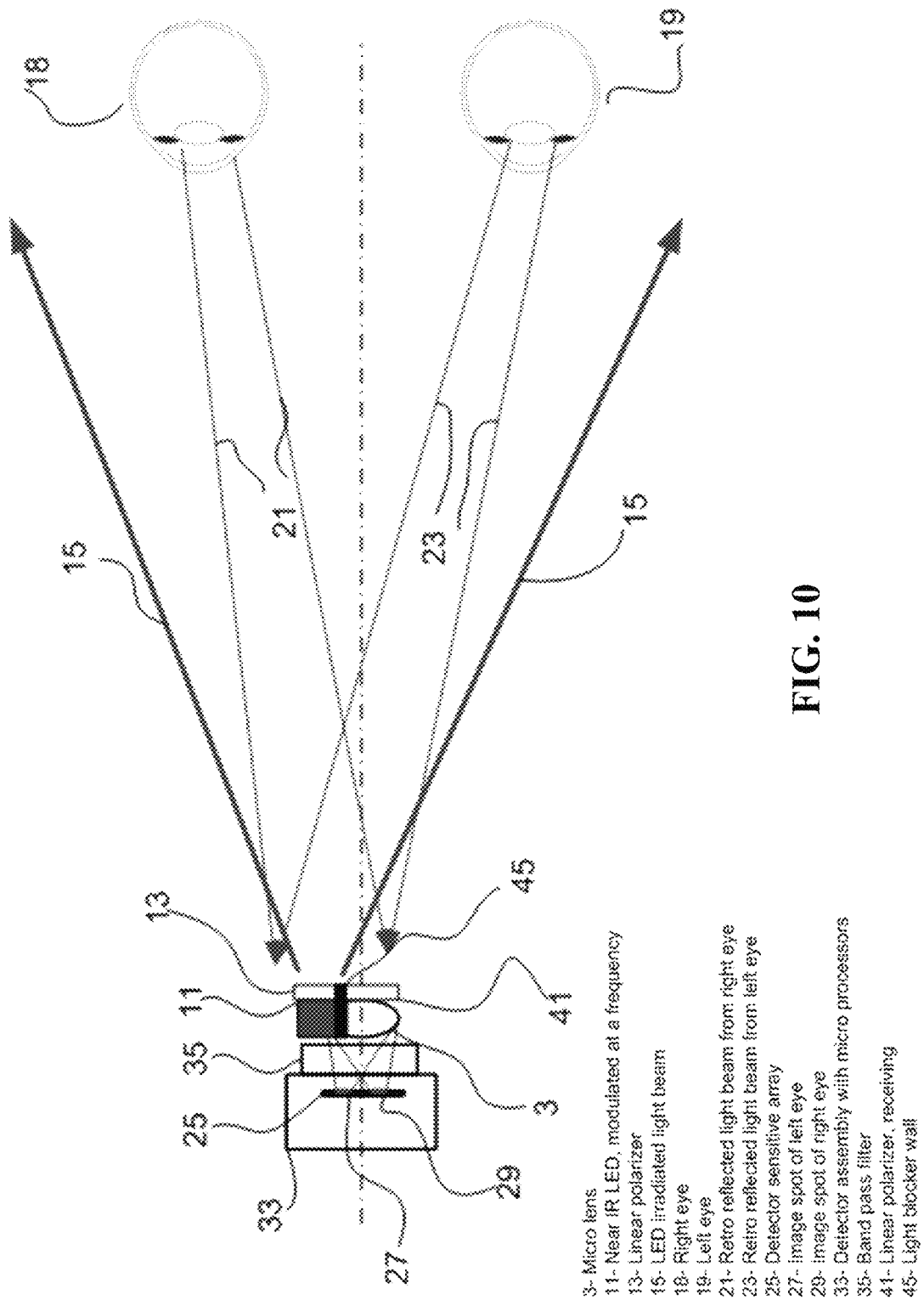

FIG. 10

3- Micro lens
11- Near IR LED, modulated at a frequency
13- Linear polarizer
15- LED irradiated light beam
18- Right eye
19- Left eye
21- Retro reflected light beam from right eye
23- Retro reflected light beam from left eye
25- Detector sensitive array
27- image spot of left eye
29- image spot of right eye
33- Detector assembly with micro processors
35- Band pass filter
41- Linear polarizer, receiving
45- Light blocker wall

USER INTERFACE BASED ON OPTICAL SENSING AND TRACKING OF USER'S EYE MOVEMENT AND POSITION

CROSS REFERENCE TO RELATED APPLICATIONS

This patent document claims the benefit of priority of U.S. Provisional Application No. 61/876,726, entitled "USER INTERFACE BASED ON OPTICAL SENSING AND TRACKING OF USER'S EYE MOVEMENT AND POSITION," and filed on Sep. 11, 2013, the disclosure of which is incorporated by reference as part of the specification of this document.

TECHNICAL FIELD

This patent document generally relates to eye tracking and eye reaction sensing technologies.

BACKGROUND

Electronic devices rely on various user movements as input to perform different functions and to operate in various modes or states. For examples, user gestures such as hand movements can be detected and translated into user control of a menu item or a game function. Similar to gestures, eye movements can be detected to perform scroll operation, to keep a screen turned on, or to operate a head-up-display.

Eye tracking is the technique of measuring a point of a person's gaze, i.e., where the person's eyes are looking at, or following the movement of the point of gaze. Eye tracking devices and systems can detect and measure eye positions and eye movement. Eye tracking technology has been used clinically to help people with disabilities, in research on the visual system, in medical and cognitive studies, as well as in psychology, in cognitive linguistics and in product design.

SUMMARY

Techniques, systems, and devices are described for optical sensing of reflected light, including retroreflected light, from an eye and tracking of eye movement using a user interface to interact with a device. In some implementations, for example, the optical sensing and tracking functions are integrated into the device. The subject matter described in this patent document can be implemented in specific ways that provide one or more of the following features. For example, the disclosed eye tracking technology can be integrated with mobile devices (e.g., smartphones and tablets) and computing devices (e.g., such as computer monitors) to track an operator's eye position, movement, and blinking state. The disclosed technology can use the retroreflection of light from the eye based on fixation and saccade eye movements for optical sensing and eye tracking.

In one aspect, a technique for tracking the movement of an eye is disclosed. The disclosed technique can be performed by using multiple light sources substantially equally spaced from a photodetector module of a device to emit light toward an eye of a user. The light sources are polarized by a polarizer. At least a partial retroreflection of the light retroreflected from the eye can be received at the photodetector module. The technique can be used to filter the received retroreflected light to reject background light and co-polarized light. The technique can be used to determine a positional parameter of the eye based on differential values of the at least partial retroreflections corresponding to the multiple light sources.

In some implementations, the technique can be used to filter the received retroreflected light to reject the background light using a bandpass filter and the co-polarized light using the polarizer.

In some implementations, the multiple light sources can emit light of different colors.

In some implementations, a color of the light can be red, green, blue, or yellow.

In some implementations, the multiple light sources can emit light of different wavelengths.

In some implementations, the multiple light sources can emit light of different modulation frequencies.

In some implementations, the multiple light sources and the photodetector module can be located on an edge of the device.

In some implementations, the emitted light can include infrared light.

In some implementations, the emitted light can include flashing light at a frequency correlated with a frame rate of the photodetector module to further reject the background light.

In some implementations, the technique can use the at least partial retroreflections received at the photodetector module to detect blinking movements of the eye.

In some implementations, the technique can be used to process the detected blinking movements as data to be used by the device.

In some implementations, the technique can be performed by using the detected blinking movement data as input data for at least one function of the device.

In some implementations, the device can include a smartphone, a tablet, a picture or video camera, a computer monitor, or a laptop computer.

In some implementations, the photodetector module can include a camera of the smartphone, tablet, picture or video camera, computer monitor, or laptop computer.

In some implementations, the positional parameter of the eye can include a direction in which the eye is looking or a location of the eye in space.

In some implementations, the light can be emitted by the multiple light sources concurrently.

In some implementations, the technique can include concurrently emitting the light using the multiple light sources and receiving the retroreflection at the photodetector module.

In some implementations, the technique can include sequentially emitting the light using the multiple light sources and receiving the retroreflection at the photodetector module. For example, the technique can include sequentially performing the following: emitting a first light from a first light source of the multiple light sources; capturing, using the photodetector module, a first image of the retroreflection of the first emitted light retroreflected by the eye in a first video frame; emitting a second light from the light source of the multiple light sources; capturing, using the photodetector module, a second image of the retroreflection of the second emitted light retroreflected by the eye in a second video frame; emitting a third light from the light source of the multiple light sources; and capturing, using the photodetector module, a third image of the retroreflection of the third emitted light retroreflected by the eye in a third video frame.

In some implementations, the technique can include grouping the first, second, and third video frames in a data set.

In another aspect, a device having an eye-tracking feature is disclosed. The eye-tracking device includes a user-operated device including a device exterior and multiple light sources on the device exterior and operable to emit light. The device includes a photodetector module on the exterior substantially equally spaced from the multiple light sources. The photodetector module can receive light including retroreflected light from an eye of a user of the user-operated device based on emitted light from the multiple light sources to form an image. The device also includes a processor in communication with the multiple light sources and the photodetector module. The processor can process information from the photodetector module to obtain differential values of at least partial retroreflections of the eye apparent in a formed image corresponding to emitted light from the multiple light sources and to determine a position of the eye based on the obtained differential values.

In some implementations, the device also can include a memory unit coupled to the processor to store the determined position of the eye.

In some implementations, the user-operated device can include a smartphone, a tablet, a picture or video camera, a computer monitor, or a laptop computer.

In some implementations, the photodetector module can include a camera of the smartphone, tablet, picture or video camera, computer monitor, or laptop computer.

In some implementations, the multiple light sources can emit colored light of different colors, different wavelengths, or different modulation frequencies.

In some implementations, the colored light includes a red light, green light, blue light, or yellow light.

In some implementations, the multiple light sources can emit infrared light.

In some implementations, the multiple light sources can emit flashing light at a frequency correlated with a frame rate of the photodetector module.

In some implementations, the multiple light sources can include LEDs.

In another aspect, a portable device having an eye-tracking feature is disclosed. The portable device can include a display screen and a surface adjacent to the display screen. The portable device can include multiple light sources on the surface and operable to emit light. The portable device can include a photodetector module on the surface to be substantially equally spaced from the multiple light sources and operable to receive light including retroreflected light from an eye of a user of the user-operated device based on emitted light from the multiple light sources and form an image. The portable device can include a processor in communication with the multiple light sources and the photodetector module. The processor can process information from the photodetector module to obtain differential values of at least partial retroreflections of the eye apparent in a formed image corresponding to emitted light from the multiple light sources and to determine a position or a movement of the eye based on the obtained differential values.

In some implementations, the processor can use the determined position or movement of the eye to trigger an operation that causes an indicator to be displayed on the display screen.

In some implementations, the processor can use different determined positions or movements of the eye to trigger different operations, respectively.

In another aspect, a technique for tracking the movement of an eye is disclosed. This technique can be performed by using a light source disposed in a user device to emit light modulated at a particular frequency or frequencies toward an eye of a user. The emitted light is polarized by a polarizer. The technique can be performed by using a photodetector module disposed in the user device to detect retroreflected light from at least one eye of the user. Detecting the retroreflected light can include the following: receiving at least a partial retroreflection of the emitted light retroreflected from one or both of the left and the right eye of the user; filtering the received retroreflected light to reject the background light; and demodulating the filtered light to separate retroreflected light of the modulation frequency or frequencies from light not of the modulation frequency or frequencies. The technique includes determining a positional parameter of the eye based on differential values of the demodulated retroreflections.

In some implementations, a light source in a wavelength, such as 700-850 nm can induce a strong retroreflection from the eye.

In some implementations, multiple light sources can be used to emit multiple light beams of different wavelengths or of different modulation frequencies or different phases.

In some implementations, the multiple light beams emitted by the light source can include a light beam emitted at wavelengths including 700-850 nm to have strong retroreflection from the eye, and a light beam emitted at wavelengths including 920-1020 nm to have weak or no retroreflection from the eye.

In some implementations, the multiple light beams emitted by the light source can include a light beam modulated at phase zero and a light beam at phase shifted about $\pi$.

In some implementations, the multiple light sources and the photodetector module can be located on an edge of the user device.

In some implementations, the multiple light sources and the photodetector module can be disposed on the user device separated from each other by a distance corresponding to a pupil diameter size including 2 to 8 mm.

In some implementations, the emitted light can include one or both of visible and infrared light.

In some implementations, the emitted light can include flashing light at a frequency correlated with a frame rate of the photodetector module to further reject the background light.

In some implementations, the technique can include using the at least partial retroreflections received at the photodetector module to detect blinking movements of the eye.

In some implementations, the technique can include processing the detected blinking movements as data for use by the user device.

In some implementations, the technique can include using the detected blinking movement data as input data for at least one function of the device.

In some implementations, the user device can include a smartphone, a tablet, a picture or video camera, a computer monitor, or a laptop computer.

In some implementations, the positional parameter of the eye can include a direction in which the eye is looking or a location of the eye in space.

In some implementations, the emitted modulated light can be emitted by multiple light sources concurrently.

In some implementations, the technique can include concurrently emitting the light using the multiple light sources and receiving the retroreflection at the photodetector module.

In some implementations, the technique can include sequentially using the multiple light sources to emit modulated light at different frequencies and receiving the at least partial retroreflection at the photodetector module. For example, the technique can include sequentially performing the following: emitting a first light from a first group of light sources at wavelengths including 700-850 nm to induce a strong retroreflection by the eye; capturing, using the photodetector module, a first image of the retroreflection of the first emitted light retroreflected by the eye in a first video frame; emitting a second light from the second group of light sources at wavelengths including 920-1020 nm to induce a weak or no retroreflection by the eye; capturing, using the photodetector module, a second image of the retroreflection of the second emitted light retroreflected by the eye in a second video frame; calculating the differential between the video frames; and based on the differential, selecting an eye retroreflection signal from background scattering.

In some implementations, the technique can include grouping the first and second video frames in a data set.

In some implementations, the first and second video frames can be captured substantially simultaneously when the two group of light sources are modulated at different frequencies.

In some implementations, the light can be emitted by the light source concurrently.

In some implementations, the technique can include concurrently emitting the light using the light source and receiving the retroreflection at the photodetector module.

In some implementations, the technique can include sequentially emitting the light using the light source and receiving the retroreflection at the photodetector module. For example, the technique can include capturing, using the photodetector module, a first image of the retroreflection of the first emitted light retroreflected by the eye in a first video frame. The technique can include capturing, using the photodetector module, a second image of the retroreflection of the second emitted light retroreflected by the eye in a second video frame. The technique can include comparing, among image pixels of the photodetector module, the first and the second image to determine a position of the eye.

In some implementations, the technique can include grouping the first and second video frames in a data set.

In some implementations, nearby frames can be compared to determine differential images to determine the position of the eye.

In yet another aspect, a technique for tracking the movement of an eye is disclosed. This technique includes emitting from multiple light sources positioned around a photodetector module light toward an eye of a user. The multiple light sources are arranged such that a given light source in the multiple light sources is distinguishable from other light sources in the multiple light sources. A combined retroreflection of the light retroreflected from the eye corresponding to the multiple light sources can be received at the photodetector module. The technique includes distinguishing the combined retroreflection to determine a separate retroreflection component corresponding to each of the multiple light sources using the photodetector module. The technique includes determining a positional parameter of the movement of the eye based on differential values of the separated retroreflections corresponding to the multiple light sources.

In some implementations, the multiple light sources can include at least three light sources.

In some implementations, the multiple light sources can be positioned around the photodetector module with positional offsets to achieve differential values of the separated retroreflections in both an x-direction and a y-direction.

In some implementations, the multiple light sources can be distinguishable from each other according to the emission colors. For example, each of the multiple light sources can emit a light at a wavelength different from wavelengths of other light sources in the multiple light sources.

In some implementations, each of the multiple light sources can emit an intensity modulated light, and the multiple light sources can emit the intensity modulated lights at different modulation frequencies.

In some implementations, the multiple light sources can be distinguishable from each other according to the modulation frequencies. For example, the multiple light sources can emit light at the same wavelength but different modulation frequencies.

In some implementations, a given light source in the multiple light sources can emit a light having a combination of a wavelength and a modulation frequency which is different from combinations of wavelength and modulation frequency of other light sources in the multiple light sources.

In some implementations, the photodetector module can receive the combined retroreflection of the light retroreflected from the eye corresponding to the multiple light sources at the same time.

BRIEF DESCRIPTION OF THE DRAWINGS

FIG. 7A shows a diagram of an exemplary eye tracking device of the disclosed technology with calibration functions.

FIG. 7B shows a diagram of an exemplary eye tracking device of the disclosed technology used for operating a user device by detecting eye movement and/or blinking to control functions of the device.

FIG. 10 shows a diagram of an exemplary eye tracking device of the disclosed technology including a single sensor set with a light blocking barrier and used for detecting eye movement and/or blinking to control functions of a device.

DETAILED DESCRIPTION

Figure 1:
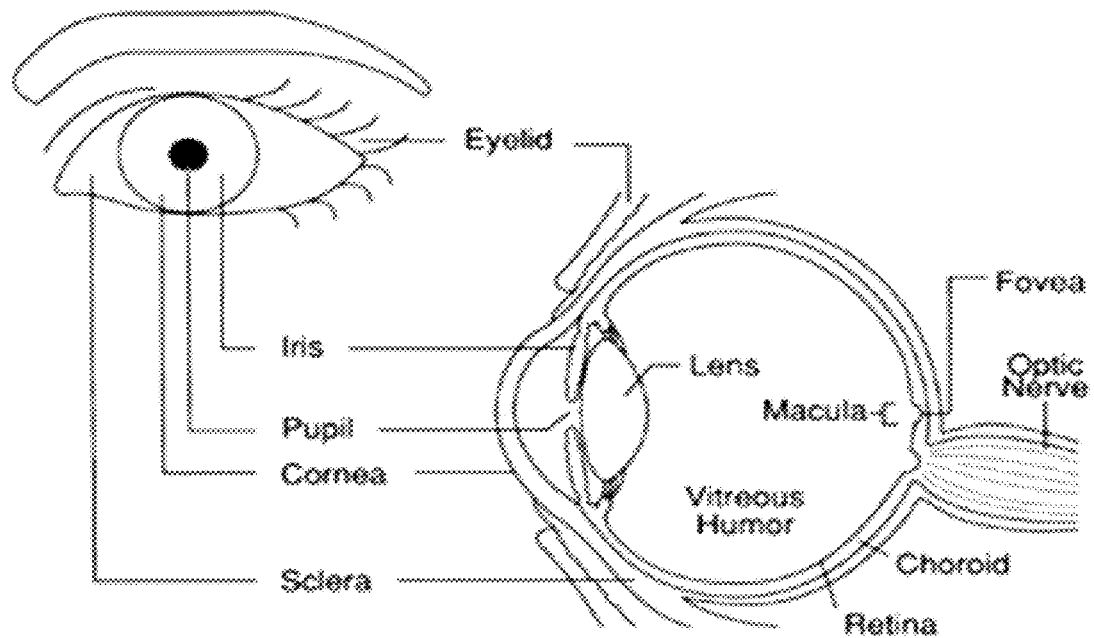
FIG. 1 shows a diagram of an anatomy of a human eye.

A video-based eye tracking system uses techniques such as the single point method that includes tracking one visible feature of the eyeball, e.g., such as the limbus (the boundary of sclera and iris) or the pupil. For example, a video camera can observe one of the user's eyes. Image processing software analyzes the video image and traces the tracked feature. Based on calibration, the video-based eye tracking system determines where the user is currently looking. In the video tracking system as described, head movements can be reduced by using a bite bar or head rest. In an alternative but related example of a video-based eye tracking technique, substantially the same idea is implemented as in the previously described example of the single point method, except that two features of eye are tracked, e.g., corneal reflection and the pupil. The two feature tracking method can use infrared (IR) light (invisible to human eye) to produce corneal reflection and to cause a bright or dark pupil, which helps the system to recognize pupil from video image.

The described video-based tracking systems and techniques uses extra or multiple device(s) either mounted on floor or head to perform the tracking. Also, the described video tracking methods tend to use eye tracking systems or devices that cannot be integrated into mobile devices like smartphones or tablets. Additionally, the video-based eye tracking methods tend to provide very limited information that can be withdrawn even when using bright pupil measuring or dark pupil measuring, and the associated software can be quite complicated and unreliable.

Techniques, systems, and devices are disclosed for optical sensing and tracking of eye movement using a user interface to interact with a device. In some implementations, for example, the optical sensing and tracking functions are integrated into the device.

The disclosed eye tracking technology can be integrated with mobile devices (e.g., smartphones and tablets) and computing devices (e.g., such as computer monitors) to track an operator's eye position, movement, and blinking state. The disclosed technology can use the retroreflection of light from the eye based on fixation and saccade eye movements for optical sensing and eye tracking In one aspect, a method for tracking the movement of an eye includes emitting light toward an eye of a user using multiple (e.g., three or more) light sources substantially equally spaced from a photodetector module (e.g., a camera) of a device, receiving at the photodetector module at least a partial retroreflection of the light emitted by each of the multiple light sources retroreflected from the eye, and determining a positional parameter of the eye based on differential values of the at least partial retroreflections corresponding to the multiple light sources. For example, the device can include, but is not limited to, a smartphone, a tablet, a picture or video camera, a computer monitor, or a laptop computer. In some implementations, for example, the method can be implemented while the head of the user is in motion, e.g., relative to the device. In some implementations of the method, for example, the multiple (e.g., three) light sources can emit colored light of different colors, e.g., in which the colored light can include red light, green light, blue light, and yellow light, or any combination thereof, different wavelengths, and/or different modulations of frequency. In some implementations of the method, for example, the emitted light can include infrared light. Also, for example, the emitted light can include flashing light at a frequency correlated with a frame rate of the photodetector module (e.g., camera). In some implementations, for example, the method further includes using the at least partial retroreflections received at the exemplary camera, detecting blinking movements of the eye. Additionally, the method can further include processing the detected blinking movements as data, and in some implementation, the method can also use the data as input data for at least one function of the device.

Various embodiments of the disclosed eye tracking technology are now described.

FIG. 1 shows a diagram of the anatomy of a human eye. The outer wall of the eye includes three concentric layers. The outer layer includes the cornea, which is a transparent structure that covers the iris and lens that function as the focusing system of an eye, and the sclera, which is an opaque structure forming a fibrous, protective, outer layer of the eye containing collagen and elastic fiber and also referred to as the 'white of the eye'. The iris is a thin, circular structure in the eye containing pigment, e.g., determining one's 'eye color', and that controls the diameter and size of the pupil. The pupil is the adjustable opening at the center of the iris that allows varying amounts of light to enter the eye through the lens. The lens is a transparent, biconvex structure that can refract light to focus it on the retina. The retina is a layered structure in the back of the eye with several layers of neurons (the photoreceptor cells) interconnected by synapses to receive the focused light as an image and transduce the image into electro-chemical neurological signals. The photoreceptor cells of the retina include cones (e.g., ~6% of the photoreceptor cells) and rods (e.g., ~94% of the photoreceptor cells), which are located mainly along the peripheral of the retina. Cones are concentrated in the center region of the retina, known as the fovea. The macula is an oval-shaped highly pigmented yellow spot near the center of the retina and containing the fovea, parafovea, and perifovea. The fovea is a small pit that contains the largest concentration of cone cells in the eye and is responsible for central, high resolution vision. The choroid is a region of the eye rich in blood vessels that supplies the outer layers of the retina. The eye also includes fluids such as the aqueous humor located in the front region between the cornea and the iris and the vitreous humor located in the rear region behind the lens.

The vision field is generally divided in to three regions: the fovea, parafovea and peripheral vision regions. The fovea region provides the sharpest vision; the parafovea region previews foveal information; and the peripheral vision reacts to flashing objects and sudden movements. For example, peripheral vision includes approximately 15-50% of the acuity of the fovea and it is also less color-sensitive.

Figure 2:
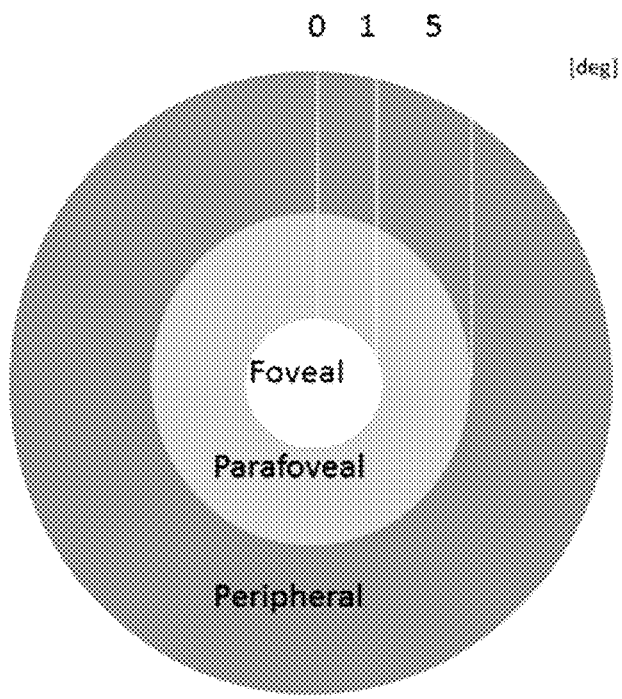
FIG. 2 shows a diagram of a vision field including the fovea, parafovea and peripheral vision regions.

FIG. 2 shows a diagram of the vision field including the fovea, parafovea and peripheral vision regions with an exemplary degree of the visual field that the regions can see. In the human eye, the three vision field regions are asymmetric. For example, in reading, the so-called perceptual span (e.g., size of the effective vision), is 3-4 letter spaces to the left of fixation and 14-15 letter spaces to the right. Also for example, 1° of visual angle is roughly equivalent to 3-4 letter spaces.

Eyes move all the time, e.g., even during sleep. There are several different types of eye movement which can include pursuit, tremor, rotation, drift, and saccades. In humans, the eyes move around when looking at a scene, rather than a fixed steadiness, locating parts of interest of the scene to mentally create a three-dimensional map corresponding to the scene. For example, when scanning a scene or while reading words on a page, the eyes make jerky saccadic movements and stop several times, moving very quickly between each stop. A saccade is a fast movement or 'jump' of an eye, which connect fixations.

Saccades can be quick, simultaneous movements of both eyes in the same direction. Saccades occur rapidly, e.g., with durations of 40-120 ms, move quickly, e.g., up to 600°/s, and are ballistic, in which the end point of saccade cannot be changed during the movement. The saccadic movements of the human eye may be due to the role of the in resolving objects detected in vision, e.g., such that by moving the eye so that small parts of a scene can be sensed with greater resolution using the visual processing functionality of the nervous system more efficiently. A visual fixation, on the other hand, is when the eye maintains a gaze on a single location. In fixation, the eye is a relatively still and 'fixated' to the certain point, e.g., such as when reading a single word. In vision, information from the scene is mainly acquired during fixation. For example, the duration of fixation can vary from 120-1000 ms, e.g., typically 200-600 ms, and a typical fixation frequency is less than 3 Hz.

Figure 3A:
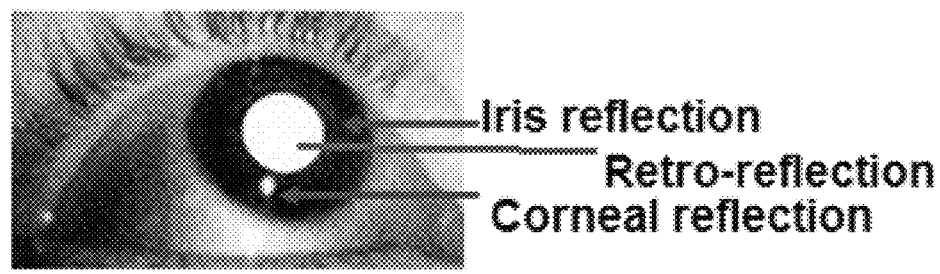
FIG. 3A shows an image of an eye illustrating examples of the three reflections when the eye is illuminated by light sources.
Figure 3B:
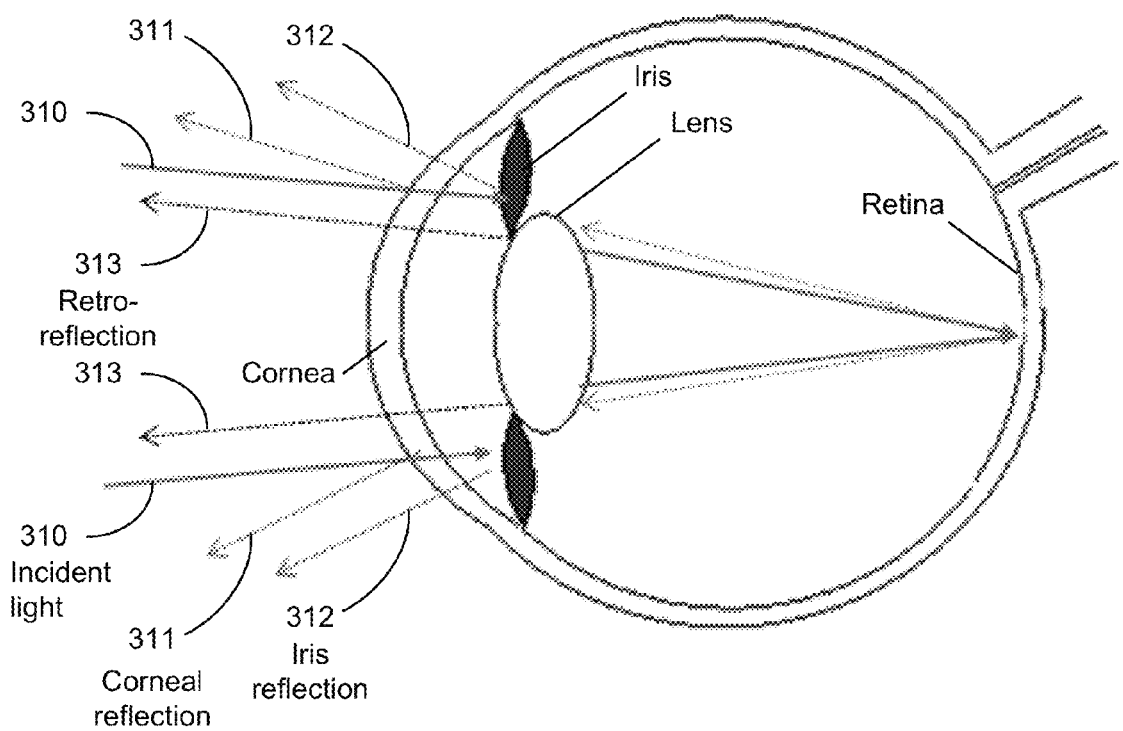
FIG. 3B shows a diagram of an eye illustrating examples of the three reflections when the eye is illuminated by light sources.

FIGS. 3A and 3B show an image and a diagram of an eye illustrating the three reflections when the eye is illuminated by light sources. The three types of eye reflections include corneal reflections of light reflected off the cornea, iris reflections of light reflected off the iris, and retroreflections of light reflected off the retina. FIG. 3A shows an image of an eye illustrating examples of the three reflections. For example, as shown in FIG. 3A, a corneal reflection forms a tiny spot; an iris reflection can look dark but colorful; and a retroreflection can be bright with strong direction dependence.

FIG. 3B shows an diagram of an eye illustrating examples of the three reflections when the eye is illuminated by light sources. More specifically, the diagram of FIG. 3B shows a reflected light beam 311 reflected by corneal reflection based on an incident light beam 310 incident upon the cornea of an eye; a reflected light beam 312 reflected by iris reflection based on the incident light beam 310 having passed through the cornea of the eye and incident upon the iris; and a reflected light beam 313 reflected by retroreflection based on the incident light beam 310 having passed through the cornea and lens of the eye and incident upon the retina.

Figure 4A:
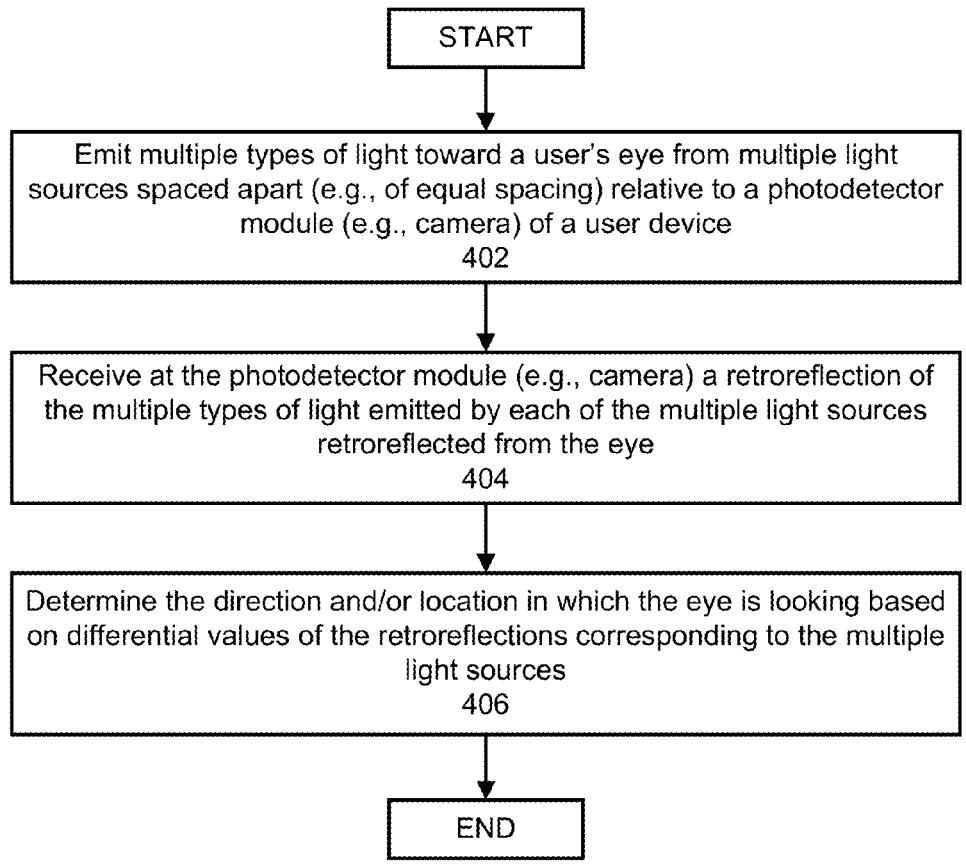
FIG. 4A shows a flowchart illustrating an exemplary process of the disclosed technology for tracking the movement of an eye.

FIG. 4A shows a flowchart illustrating an exemplary process of the disclosed technology for tracking the movement of an eye. The process includes emitting multiple (e.g., three or more) types of light from multiple respective light sources toward the eye of the user (402). In one embodiment, the multiple light sources are substantially equally spaced relative to a photodetector module (e.g., a camera) of a user's device. For example, the process step can be implemented using one camera as the photodetector module, in which the three light sources are offset from the camera with substantially equal distance.

Figure 4B:
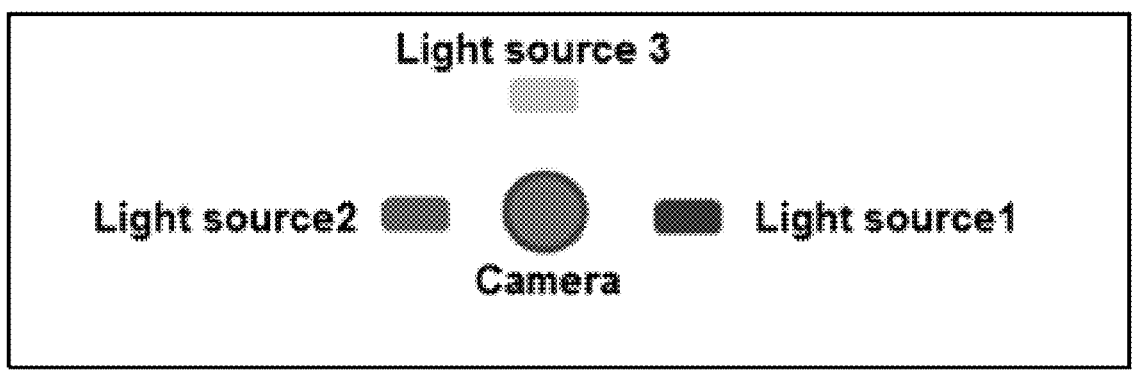
FIG. 4B shows a illustrative diagram of an exemplary interface of a user device to implement the exemplary eye tracking technique.

The process includes receiving at least a partial retroreflection of the multiple types of light emitted by each of multiple (e.g., three or more) light sources that is retroreflected from the eye using the photodetector module (e.g., the camera) (404). In one embodiment, the distance between the photodetector module (e.g., the camera) and the multiple light sources is arranged such that the photodetector module can receive at least partial of the retroreflections from each of the multiple light sources. In one embodiment, the multiple light sources can emit colored light of the same or differing colors, or in other embodiments, using infrared light to avoid stimulating the user. In some examples, the light sources can be color light-emitting diodes (LEDs), as exemplified in FIG. 4B, which shows an illustrative diagram of an exemplary interface of the user's device to implement the exemplary eye tracking technique. The exemplary LEDs in the example can be selected to emit particular RGB color, e.g., to match a color filter on the camera sensor. The exemplary LEDs can be infrared LEDs. The exemplary color or infrared LEDs can be turned on in a sequence that is synchronized with the camera video frames. Also, for example, the three light sources can emit flashing light in time domain, but it is noted that flashing light may reduce the data rate.

Referring back to FIG. 4A, the process also includes determining a positional parameter of the eye, e.g., such as the direction in which the eye is looking or the location of the eye in space, or the point of gaze of the eye (Step 406). For example, by calculating the differential values of the three retroreflections (e.g., at least partial retroreflections corresponding to the three light sources), the direction in which the eye is look, the location of the point of gaze of the eye, and other parameters of eye movement can be determined.

In some embodiments, when using multiple light sources and the retroreflections from each of the multiple light sources to determine the direction, location, and/or other positional parameters of the eye and eye movement, the multiple light sources are arranged to distinguish the retroreflection of one of the multiple light sources from the retroreflections of other light sources. Such distinctions can be achieved by using different colors of emission (i.e., different wavelengths of the light sources), as exemplified by FIG. 4B. For example, in three-light sources systems, the three colors can be Red (R), Green (G), and Blue (B), respectively. Using the system of multiple wavelengths and camera integrated with multiple color filters, the proposed technique can be used to distinguish and separate the retroreflections of multiple light sources received/captured at the same time (e.g., captured in one video frame by a camera), and determine a retroreflection component corresponding to each of the multiple wavelengths of light emissions, without the need to detect each retroreflection separately.

In some embodiments, the distinctions of the retroreflections from the multiple light sources can be achieved by using light intensity modulations. In one embodiment, the multiple light sources can have the same emission frequency/wavelength (color), but each of which is amplitude modulated with a different modulation frequency. Hence, using the multiple light sources of different modulation frequencies and a photodetector module integrated with multiple demodulation circuits for each of the modulation frequency, the proposed technique can be used to distinguish and separate the retroreflections of multiple light sources received/captured at the same time (e.g., captured in one video frame by a camera), and determine a retroreflection component corresponding to each of the multiple light sources, without the need to detect each retroreflection separately.

In some embodiments, the distinctions of the retroreflections from the multiple light sources can be achieved by using a combination of different colors of emission and different light intensity modulations. In one embodiment, each of the multiple light sources can have a combination of wavelength and modulation frequency that is different from that of another light source. For example, two of the light sources can have the same color but different modulation frequency, or same modulation frequency but different colors. Hence, using the multiple light sources of different wavelength/modulation frequency combinations and a photodetector module integrated with multiple demodulation circuits and color filters for each of the modulation frequency and colors, the proposed technique can distinguish and thereby separating the retroreflections of multiple light sources received/captured at the same time (e.g., captured in one video frame by a camera), and determine a retroreflection component corresponding to each of the multiple light sources, without the need to detect each retroreflection separately.

Note that the above described distinctions of the multiple light sources based on intensity modulations can also be used to reject background or ambient light which does not have the modulations.

In some examples, the process to determine the direction, location, and/or other positional parameters of the eye and eye movement can include the following features.

The disclosed technique is not sensitive to eye distance and head movement, e.g., providing a reliable eye tracking solution. The eye tracker implemented using the disclosed technique can easily detect operator eye blinking reliably, in which the blinking information can be processed as data and used as input for the device. For example, smartphone operation tends to be at a distance of 1 to 2 feet. The disclosed technique can function with head-free accuracy at a variety of distances and angles, e.g., including 0.1°-0.25°, and include head-free resolution of 0.02° rms. In some embodiments, the disclosed technique can be implemented to track the movement of both eyes of the user sequentially or concurrently.

Figure 5A:
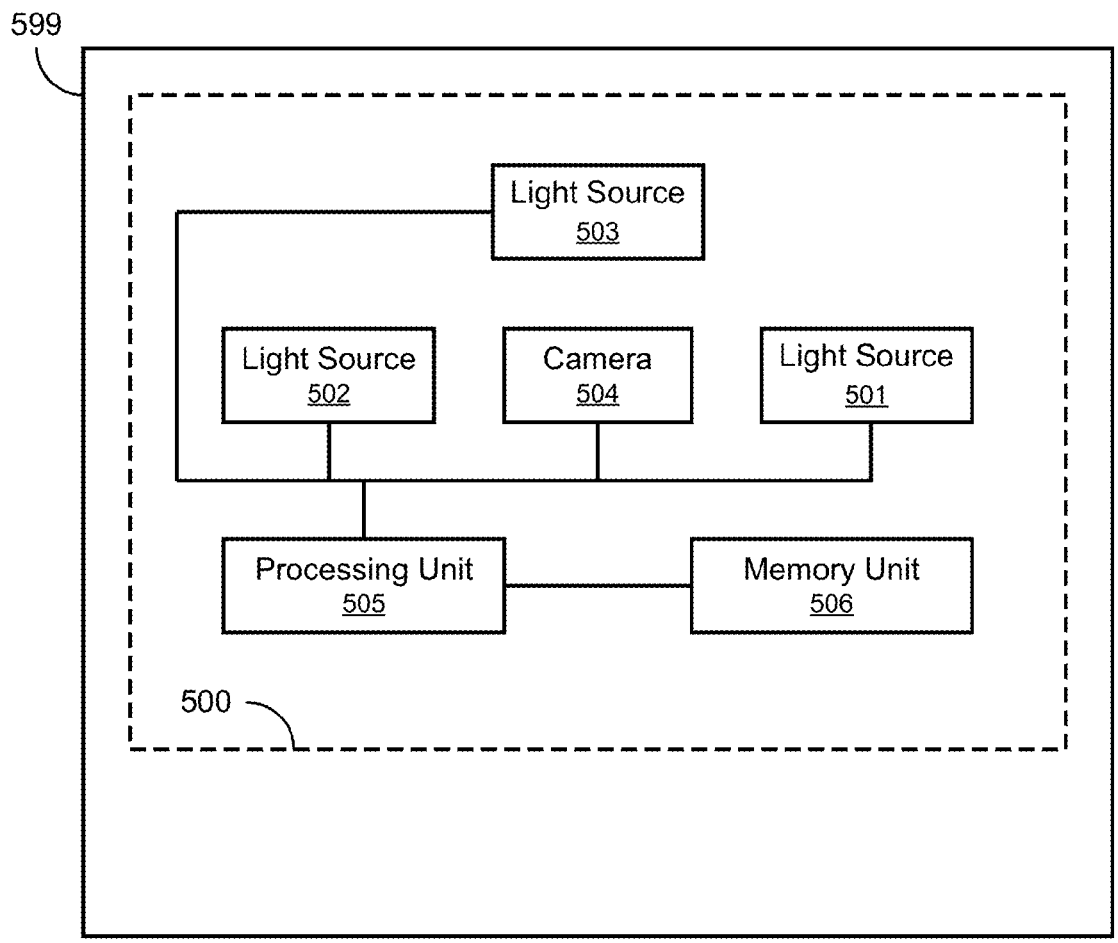
FIG. 5A shows a block diagram of an exemplary eye tracking unit of the disclosed technology implemented in a user device.

FIG. 5A shows a block diagram of an exemplary eye tracking unit 500 implemented in a user's device 599, e.g., which can be, but is not limited to, a smartphone, a tablet, a picture or video camera, a computer monitor, or a laptop computer. The eye tracking unit 500 includes three light sources 501, 502, and 503 substantially equally spaced from each other relative to a camera 504 of the device 599. The eye tracking unit 500 includes a processing unit 505 coupled to a memory unit 506. The memory unit 506 can, for example, include processor-executable code, which when executed by the processing unit 505, configures the eye tracking unit 500 to perform various operations, such as receiving information, commands, and/or data, e.g., from the camera 504, processing information and data, and transmitting or providing information/data or commands to another entity, e.g., such as the light sources 501, 502, and 503 and/or the camera 504, or to the user device 599. In some implementations, for example, the memory unit 506 can be configured as a hard disk drive (HDD) or solid-state device (SSD) storage unit.

In some implementations of the eye tracking unit 500, the eye tracking unit 500 can utilize the processing unit(s) and/or memory unit(s) of the user device 599.

Figure 5B:
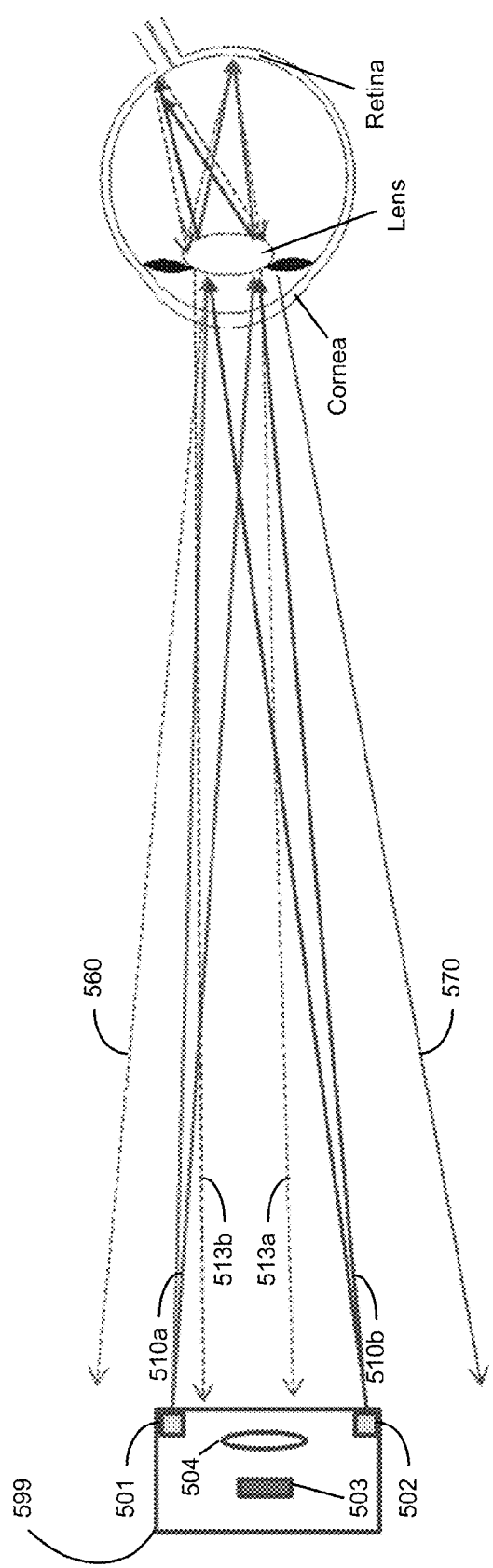
FIG. 5B shows a diagram of operation of the exemplary process described in FIG. 4A using retroreflection of the eye and multiple light sources and one camera of an exemplary mobile device.

FIG. 5B shows a diagram of operation of the exemplary process described in FIG. 4A using retroreflection of the eye and multiple light sources and one camera of the user device 599, e.g., such as a smartphone. The diagram of FIG. 5B shows reflected light beams 513a and 513b reflected by retroreflection based on incident light beams 510a and 510b produced by the light sources 501 and 502, respectively. The light path of the incident light beams 510a and 510b includes passing through the cornea and lens of the eye and becoming incident upon the retina. The light incident upon the retina can be retroreflected by the retina such that the light path of the retroreflected light passes again through the lens and cornea and directed towards its source, as shown by the retroreflected light beams 513a and 513b. The retroreflected light beams 513a and 513b can be captured by the camera 504. Some of the retroreflected light may be directed away from the user's device 599, as illustrated by retroreflected light 560 in the exemplary diagram of FIG. 5B. Also for example, some of the emitted light can be reflected from the iris, as represented in the diagram as iris reflections 570.

Figure 6A:
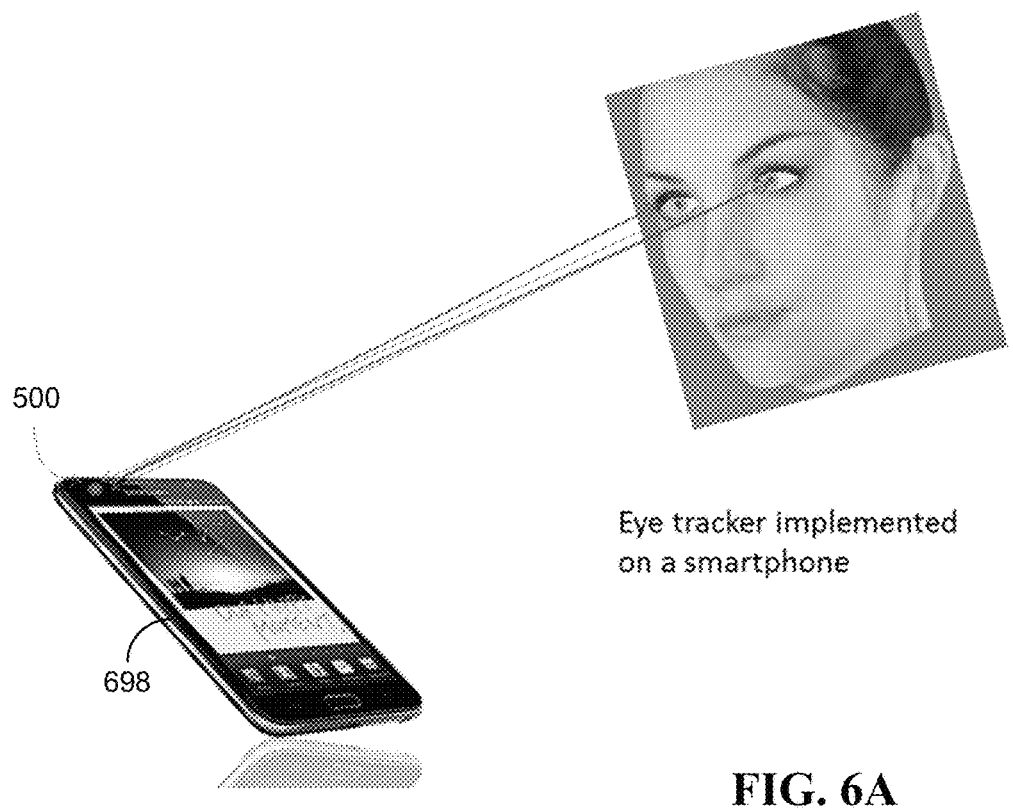
FIG. 6A shows a diagram of an exemplary eye tracking device of the disclosed technology implemented on a mobile smartphone device.

FIG. 6A shows a diagram of the exemplary eye tracking device 500 implemented on a mobile smartphone device 698.

Figure 6B:
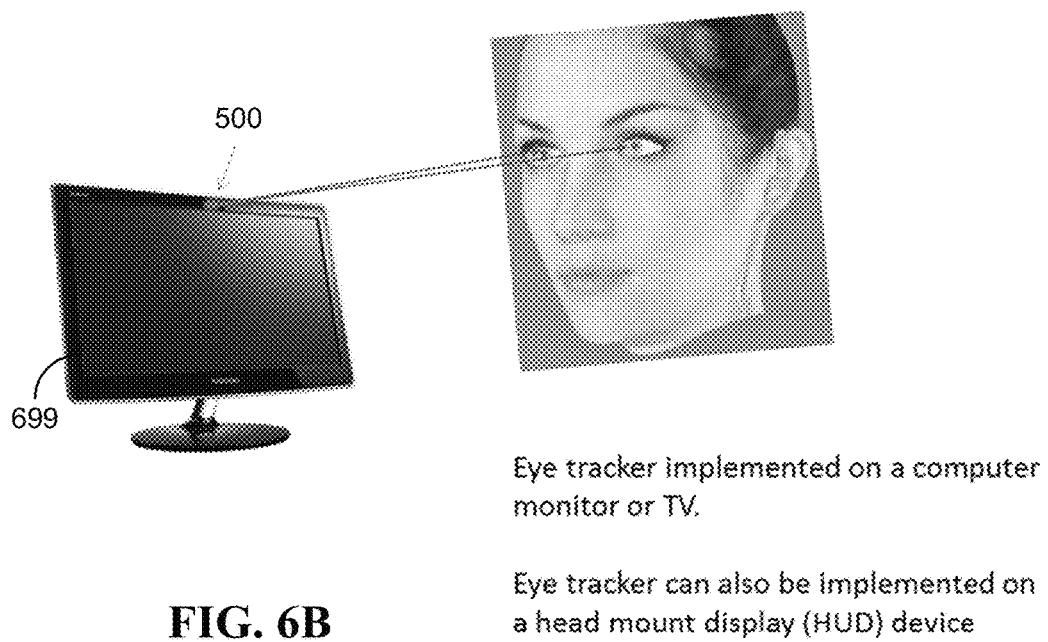
FIG. 6B shows a diagram of an exemplary eye tracking device of the disclosed technology implemented on a computer monitor or a television device.

FIG. 6B shows a diagram of the exemplary eye tracking device 500 implemented on a computer monitor or a television device 699.

In other examples, the disclosed eye tracking technology can be implemented on a head mount display (HUD) device, e.g., such as Google glass.

Referring to FIGS. 5A, 5B, 7A and 7B, in some implementations, the eye tracking unit 500 described above includes a display screen 515 configured on the same side of the exterior of the user device 599 that the light sources 501, 502 and 503 and the camera 504 are located. The display screen 515 can be communicatively coupled to the processing unit 505 and/or the memory unit 506. For example, the display screen 515 can be a display screen inherent to the user device 599.

FIG. 7A shows a diagram of an exemplary configuration of the display screen 515 of the eye tracking unit 500 that can be used for calibration of the eye tracking unit 500. For example, a fixed location marker 516 is displayed, in which a calibration operation includes user focus watching one highlighted marker at a time and pushing a select button of the user device 599. The fixed location marker 516 can be moved to several locations on the display screen 515, exemplified in the four corners and center of the screen, in which the active marker is indicated in red. For example, the fixed location marker 516 can be shown several times and in the several locations to be displayed to carry out the calibration operation.

FIG. 7B shows a diagram of the eye tracking unit 500 including the display screen 515 and operated in any of a variety of applications in which eye movement is used as input data for the user device 599 in which the eye tracking unit 500 is implemented. For example, the eye tracking unit 500 can detect positional parameters of the user's eyes in user-performed operations, including, but not limited to, ocularly select buttons, icons or text 517 on the display screen 515 to implementing a program of the user device 599. Device 599 can include a smartphone or tablet, among others. Additionally, the disclosed eye tracking technology can use eye blinking data detected and collected by the eye tracking unit 500 to activate application functions of the user device 599.

In some embodiments, to determine and to track a two-dimensional (2D) positional parameter associated with the eye movement, such as the 2D location of the point of gaze of the user's eye on the display screen 515, at least three light sources, such as the example of the eye tracking unit 500, need to be used. While the eye tracking unit 500 uses three light sources, other embodiments for determining a 2D positional parameter of the eye movement can use more than three light sources. As mentioned above, the 2D positional parameter of the eye movement can be computed based on differential values of the at least partial retroreflections corresponding to the at least three light sources. Hence, the at least three light sources can be positioned relative to the photodetector with offsets in both an x-direction (or a first direction) and a y-direction (or a second direction perpendicular to the first) to provide differential values of the at least partial retroreflections of these light sources in both the x and the y-direction.

Figure 8:
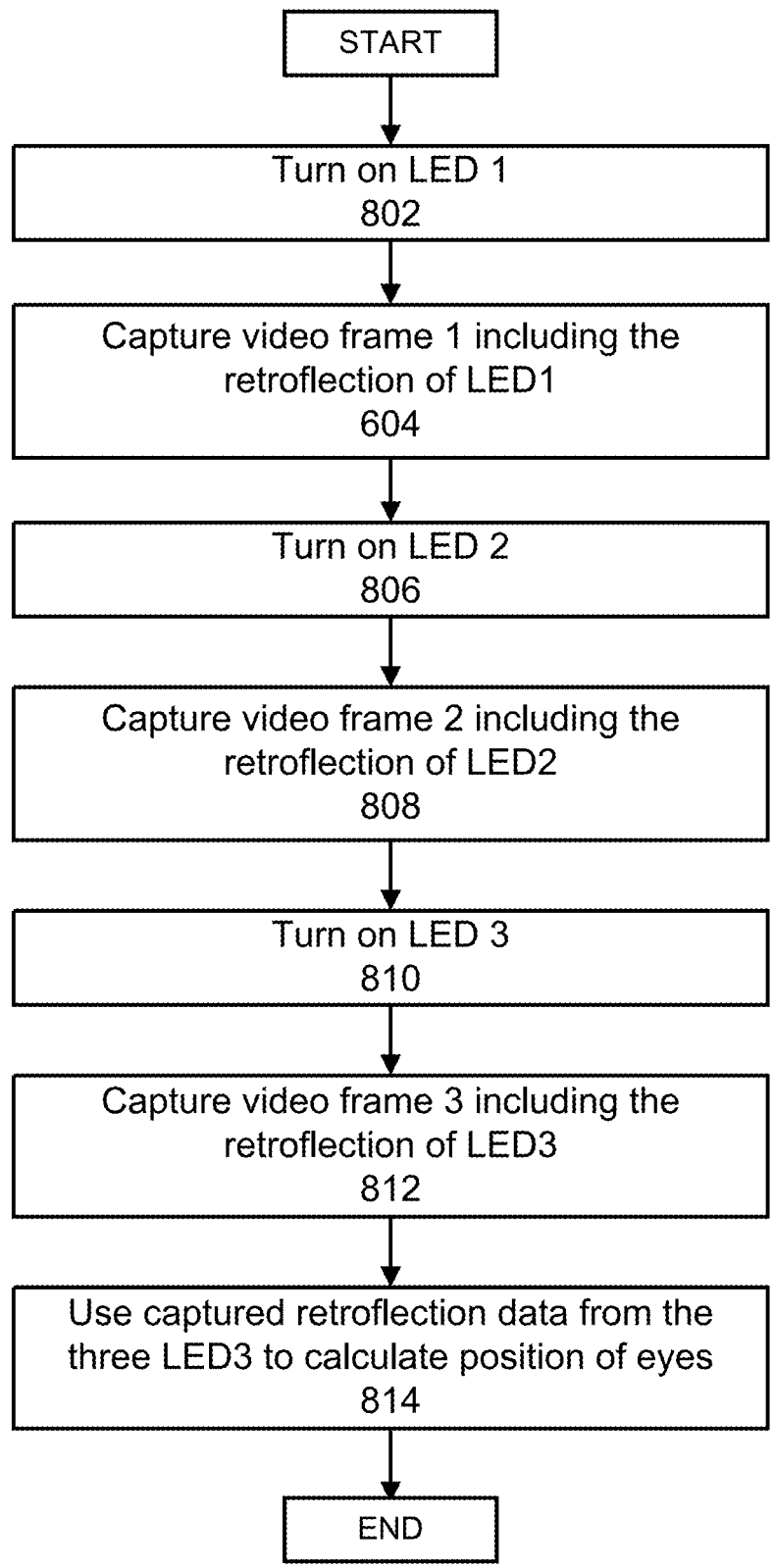
FIG. 8 shows a flowchart illustrating an exemplary process of tracking the movement of an eye using a sequential light emission and capture using an exemplary tracking unit of the disclosed technology.

FIG. 8 shows a flowchart illustrating an exemplary process of tracking the movement of an eye using a sequential light emission and capture using the tracking unit 500. The process includes emitting a first light from the light source 501, e.g., such as an LED 1 (Step 802), and capturing, using the camera 504, an image of the retroreflection of the first emitted light retroreflected by the eye in a first video frame (Step 804). The process includes emitting a second light from the light source 502, e.g., such as an LED 2 (Step 806), and capturing, using the camera 504, an image of the retroreflection of the second emitted light retroreflected by the eye in a second video frame (Step 808). The process includes emitting a third light from the light source 503, e.g., such as an LED 3 (Step 810), and capturing, using the camera 504, an image of the retroreflection of the third emitted light retroreflected by the eye in a third video frame (Step 812). The first, second, and third video frames can be included in a frame set (e.g., frame set data 1 or $\{S_1\}$). The process includes using the first, second, and third video frame data of $\{S_1\}$ including the retroreflection of LED1, LED2, and LED3 to calculate the position of the eye corresponding to an instance of time when the tracking unit 500 emits the three lights and captures the three video frames. The process may also include repeating this process (e.g., n times) to generate multiple, sequential frame sets $\{S\}_n$.

The process can also include detecting the blinking of the eye and using a detected blink as data for the device hosting the tracking unit 500. For example, when an eye of the user has blinked, the retroreflected light disappears momentarily, which can be detected over multiple-frame data set. The multiple-frame set data can then be processed to detect eye blinking. For example, multiple frame set data $\{S_n\}$ can be processed to determine the occurrence of an eye blinking event, the frequency of eye blinking events, the speed of the eye blinking, the duration of the eye blinking (e.g., how long the eye is shut), and which eye blinked (e.g., left or right eye blinked or both eyes blinked). These features associated with eye blinking can then be used as input data to effectuate a function of the device (e.g., the machine state of a smartphone or computer).

The eye tracking unit 500 includes three light sources 501, 502, and 503 substantially equally spaced from each other relative to a camera 504 of the device 599.

Figure 9:
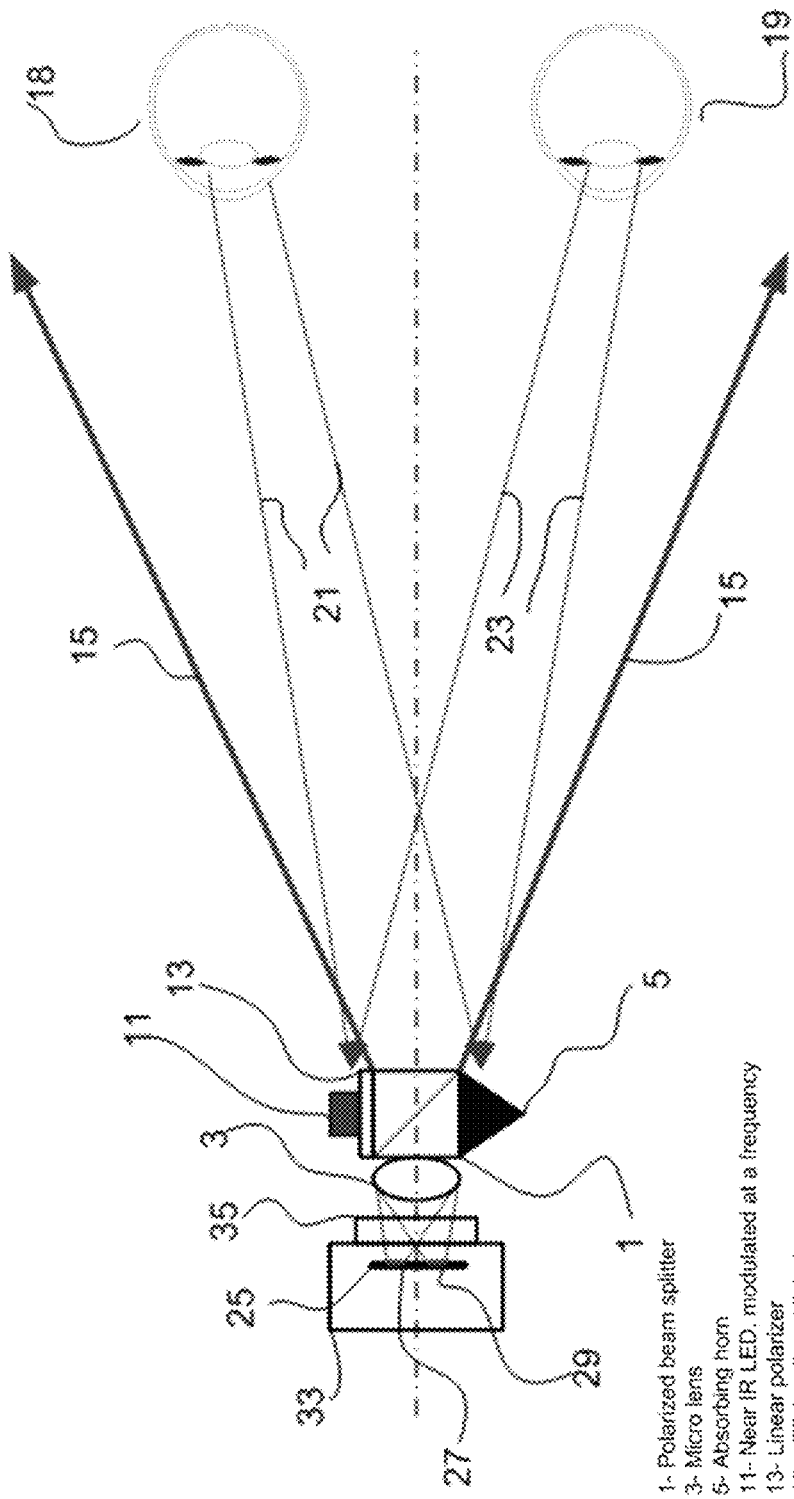
FIG. 9 shows a diagram of an exemplary eye tracking device of the disclosed technology used for detecting eye movement and/or blinking to control functions of a device.

FIG. 9 shows a diagram of an exemplary eye tracking device of the disclosed technology including a single sensor set with a prism and used for detecting eye movement and/or blinking to control functions of a device. In some implementations, the exemplary eye tracking device can operate as a high resolution "eye mouse." In the example of FIG. 9, the exemplary eye tracking device can include a polarized beam splitter 1 optically coupled to a micro lens 3, in which the micro lens 3 is positioned between the polarized beam splitter 1 and a band pass filter 35 for optically filtering an incident light before the light enters a photodetector module 33. The exemplary eye tracking device can include a light source 11 (e.g., near infrared LED 11), which can be modulated at a particular frequency or frequencies. The light source 11 is optically coupled to the linear polarizer 13 that is optically coupled to the polarized beam splitter 1 to transmit a probe light (e.g., LED irradiated light beam 15) from the device toward the eyes of the user 18 and 19, that can be retroreflected by the eyes 18 and 19. The photodetector module 33 can be structured to include a photodetector sensitive array 25 to detect the input light into the module 33, which can include retroreflected light by a user's eye after filtered by the band pass filter 35. For example, as shown in FIG. 9, the photodetector sensitive array 25 detects light at an image spot 29 corresponding to the retroreflected light beam 21 of the right eye 18 of the user and at an image spot 27 corresponding to the retroreflected light beam 23 of the left eye 19 of the user. The exemplary eye tracking device can include a processing unit communicatively coupled to the photodetector module 33 to process the photodetected signals on the photodetector sensitive array 25 as data. The processing unit can include a general purpose processor coupled to a memory unit to store the raw and processed data. The processing unit can be configured to execute programs for tracking the eye movements based on the detected retroreflected light signal data and control functions of the user device, e.g., including altering the display of the user device. In some implementations of the exemplary eye tracking device, a processing unit including a processor and memory unit of the user device is used to implement the data processing techniques of the disclosed technology.

FIG. 10 shows a diagram of an exemplary eye tracking (e.g., an eye mouse) device of the disclosed technology including a single sensor set with a light blocking barrier and used for detecting eye movement and/or blinking to control functions of a device. In this example, the exemplary eye tracking device can include a light source 11 (e.g., near infrared LED 11), which can be modulated at a particular frequency or frequencies. The light source 11 is optically coupled to the linear polarizer 13 to transmit a probe light (e.g., LED irradiated light beam 15) from the device to use's eyes 18 and 19, wherein the probe light that can be retroreflected by the eyes of the user. The exemplary eye tracking device can include a linear (receiving) polarizer 41 optically coupled to a micro lens 3 and configured near but separated from the light source 11 and linear (transmitting) polarizer 13 by a light blocker wall or barrier 45. The exemplary eye tracking device also includes a band pass filter 35 placed behind the micro lens 3 and configured to optically filter the incident light through micro lens 3 before the light enters a photodetector module 33. The photodetector module 33 can be structured to include a photodetector sensitive array 25 to detect the input light into the module 33, which can include retroreflected light by a user's eye after filtered by the band pass filter 35. For example, as shown in FIG. 10, the photodetector sensitive array 25 detects light at an image spot 29 corresponding to the retroreflected light beam 21 of the right eye 18 of the user and at an image spot 27 corresponding to the retroreflected light beam 23 of the left eye 19 of the user. The exemplary eye tracking device can include a processing unit communicatively coupled to the photodetector module 33 to process the photodetected signals on the photodetector sensitive array 25 as data. The processing unit can include a general purpose processor coupled to a memory unit to store the raw and processed data. The processing unit can be configured to execute methods to track the eye movements based on the detected retroreflected light signal data and control functions of the user device, e.g., including altering the display of the user device. In some implementations of the exemplary eye tracking device, a processing unit including a processor and memory unit of the user device is used to implement the data processing techniques of the disclosed technology.

Figure 11A:
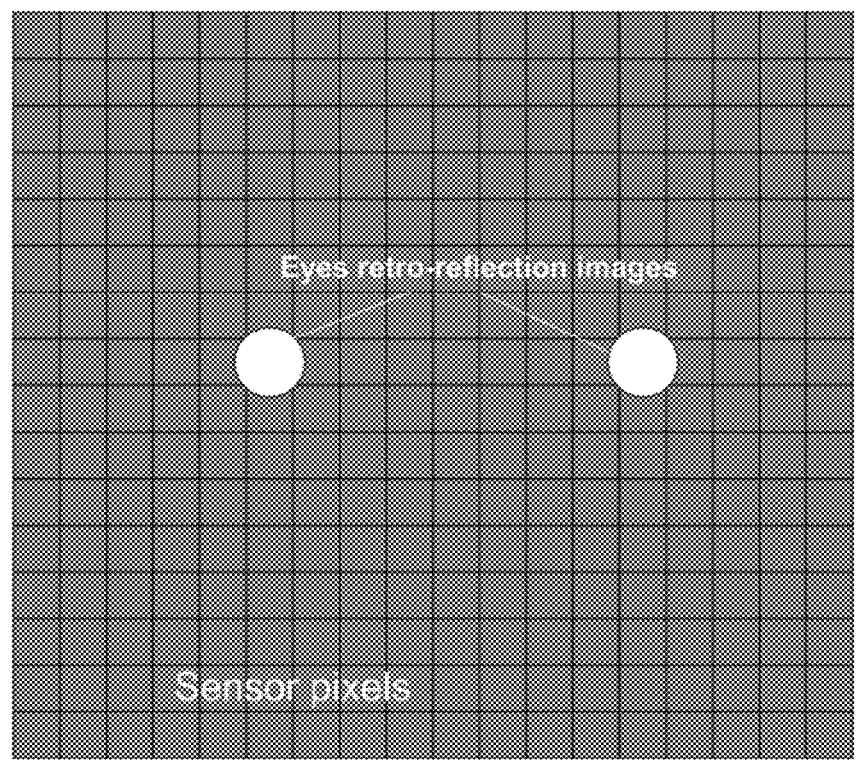
FIG. 11A shows a diagram depicting exemplary retroreflection images on the exemplary sensor surface of an exemplary eye tracking device detected from retroreflected light by the eyes of a user of the exemplary device.
Figure 11B:
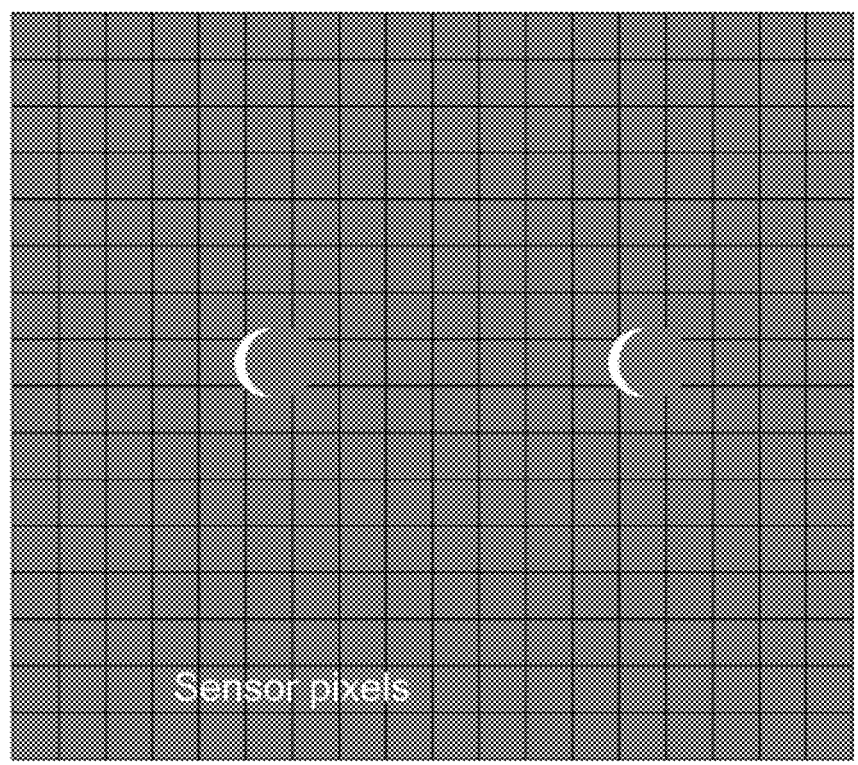
FIG. 11B shows a diagram depicting the exemplary retroreflection images on the exemplary sensor surface when the user's eyes move.

FIG. 11A shows a diagram depicting exemplary retroreflection images on the exemplary sensor surface (e.g., photodetector sensitive array 25) of an exemplary eye tracking device, such as those shown in FIGS. 9 and 10, in which the images are detected from retroreflected light by the eyes of a user of the exemplary device. FIG. 11B shows a diagram depicting the exemplary retroreflection images on the exemplary sensor surface when the user's eyes move. As can be observed in FIGS. 11A and 11B, the image differential or optical signal intensity changes can be used to generate tracking signals using a processing unit of the exemplary device.

Figure 12:
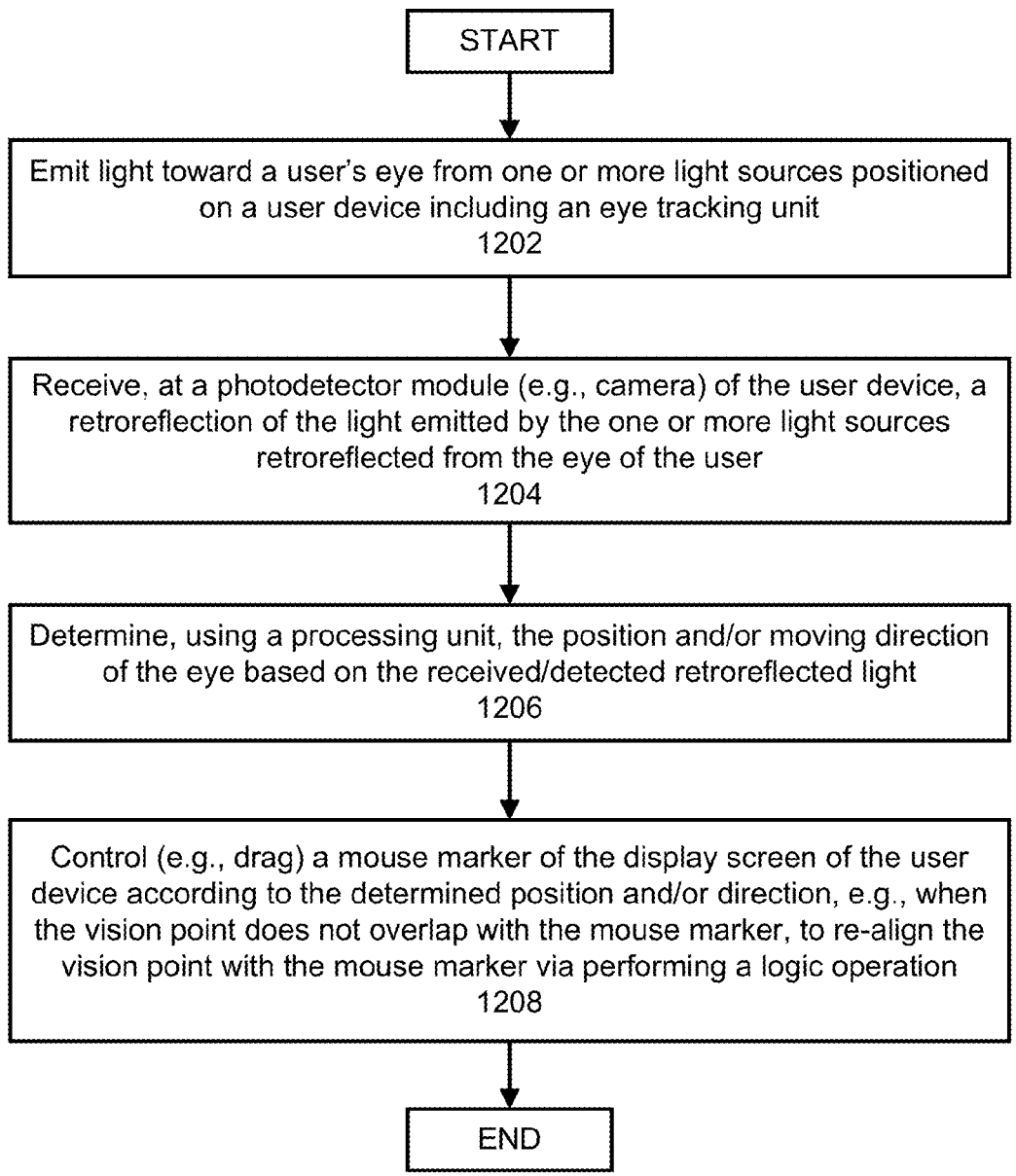
FIG. 12 shows a flowchart illustrating an exemplary process of tracking the movement of an eye and controlling a mouse marker on a display screen using the tracked eye movements.

FIG. 12 shows a flowchart illustrating an exemplary process of tracking the movement of an eye and controlling a mouse marker on a display screen using the tracked eye movements. The exemplary process can include a step to emit light toward a user's eye from one or more light sources integrated with a user's device including an eye tracking unit of the disclosed technology (Step 1202). For example, the user's device can include, but is not limited to, a smartphone, a tablet, a picture or video camera, a computer monitor, or a laptop computer. The process can include a step to receive, at a photodetector module (e.g., a camera) of the eye tracking unit in the user's device, a retroreflection of the light emitted by the one or more light sources, where the retroreflected light was retroreflected by an eye (e.g., the left eye, the right eye, and/or both eyes) of the user (Step 1204). The process can include a step to determine, using a processing unit of the eye tracking unit in the user device or a processing unit existing on the user device, a position and/or direction of movement of the eye(s) of the user based on the received/detected retroreflected light (Step 1206). In some implementations, the process can use the determined position and/or movement direction of the eye to control functions of the user device, e.g., including dragging a marker (e.g., mouse marker) on a display screen of the user device or altering the display screen according to the determined position and/or direction of movement (Step 1208). For example, when the vision point does not overlap with the mouse marker, the method can include re-aligning the vision point with the mouse marker via performing a logic operation.

Figure 13:
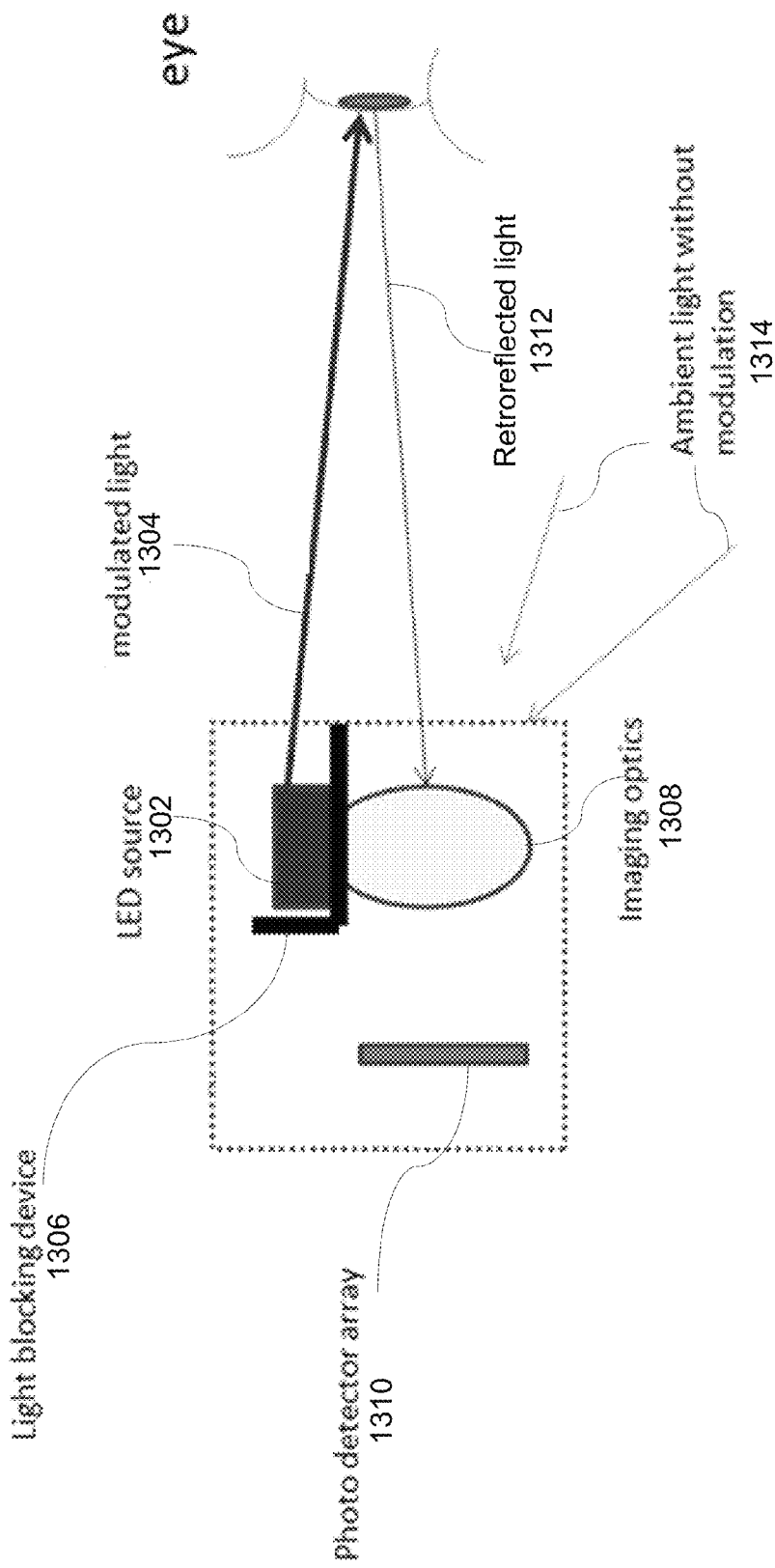
FIG. 13 shows a diagram of an exemplary eye-tracking sensor device of the disclosed technology using modulated illumination light emitter and detection modules.

FIG. 13 shows a diagram of an exemplary eye-tracking sensor device of the disclosed technology using modulated illumination light and detection units. The exemplary eye-tracking sensor device can include a light source 1302 (e.g., LED light source 1302) to emit modulated light 1304 toward a user. The exemplary eye-tracking sensor device can include one or more light blocking walls or barriers, or "light block device" 1306 positioned proximate the light source 1302 to block light emitted from the light source from shining/illuminating on an image sensor of the exemplary eye-tracking sensor device. The exemplary eye-tracking sensor device can include imaging optics 1308 (e.g., one or more micro lens(es)) to receive and direct light into the eye-tracking sensor device. In some embodiments, imaging optics 1308 can be configured proximate the walls of the light blocking device 1306 that prevent the emitted light from the light source unit 1302 from directly entering the imaging optics 1308. The exemplary eye-tracking sensor device can include a photodetector array 1310 to detect light transmitted through the imaging optics 1308. In some implementations of the exemplary eye-tracking sensor device, the light source 1302 is configured to emit modulated light (e.g., at one or more modulation frequencies) that can be retroreflected from the eye and retroreflected light 1312 to be received by the photodetector array 1310 via the imaging optics 1308 of the exemplary eye-tracking sensor device. The photodetector array 1310 can be configured to include pixels and a demodulation circuit coupled to the pixels to distinguish modulated light at the modulation frequency or frequencies emitted by the light source 1302 against other light without such modulation (e.g., ambient light 1314 in the surrounding environment). In some implementations, the exemplary eye-tracking sensor device can be communicatively coupled with a processing unit of a user device.

Figure 14:
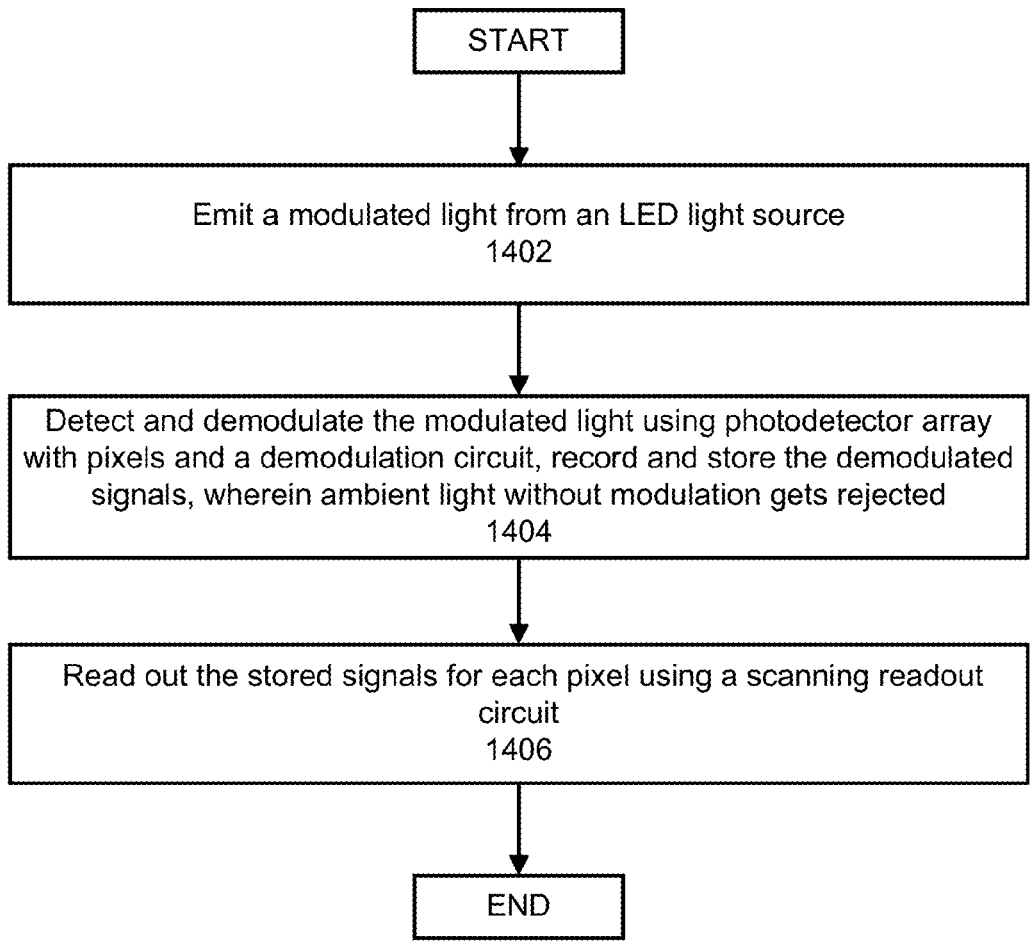
FIG. 14 shows a flowchart illustrating an exemplary process of detecting modulated eye-tracking sensor signals.

FIG. 14 shows a flowchart illustrating an exemplary process of detecting modulated eye-tracking sensor signals. The exemplary process can include a step to emit light (e.g., LED light) with a fixed modulation from a light emitting unit of an eye-tracking sensor device of the disclosed technology (Step 1402), e.g., such as the device in FIG. 13. The exemplary process can include a step to detect the modulated light at a photodetector array including pixels and a demodulation circuit coupled to the pixels, wherein the photodetector array demodulates the detected modulated light, so that the demodulated signals are recorded and stored (e.g., in a memory, which can be configured in the demodulation circuit), while light without the fixed modulation gets rejected (Step 1404). The process can also include a step to read out the stored signals for each pixel, e.g., using a scanning readout circuit coupled to or included in the demodulation circuit.

Figure 15:
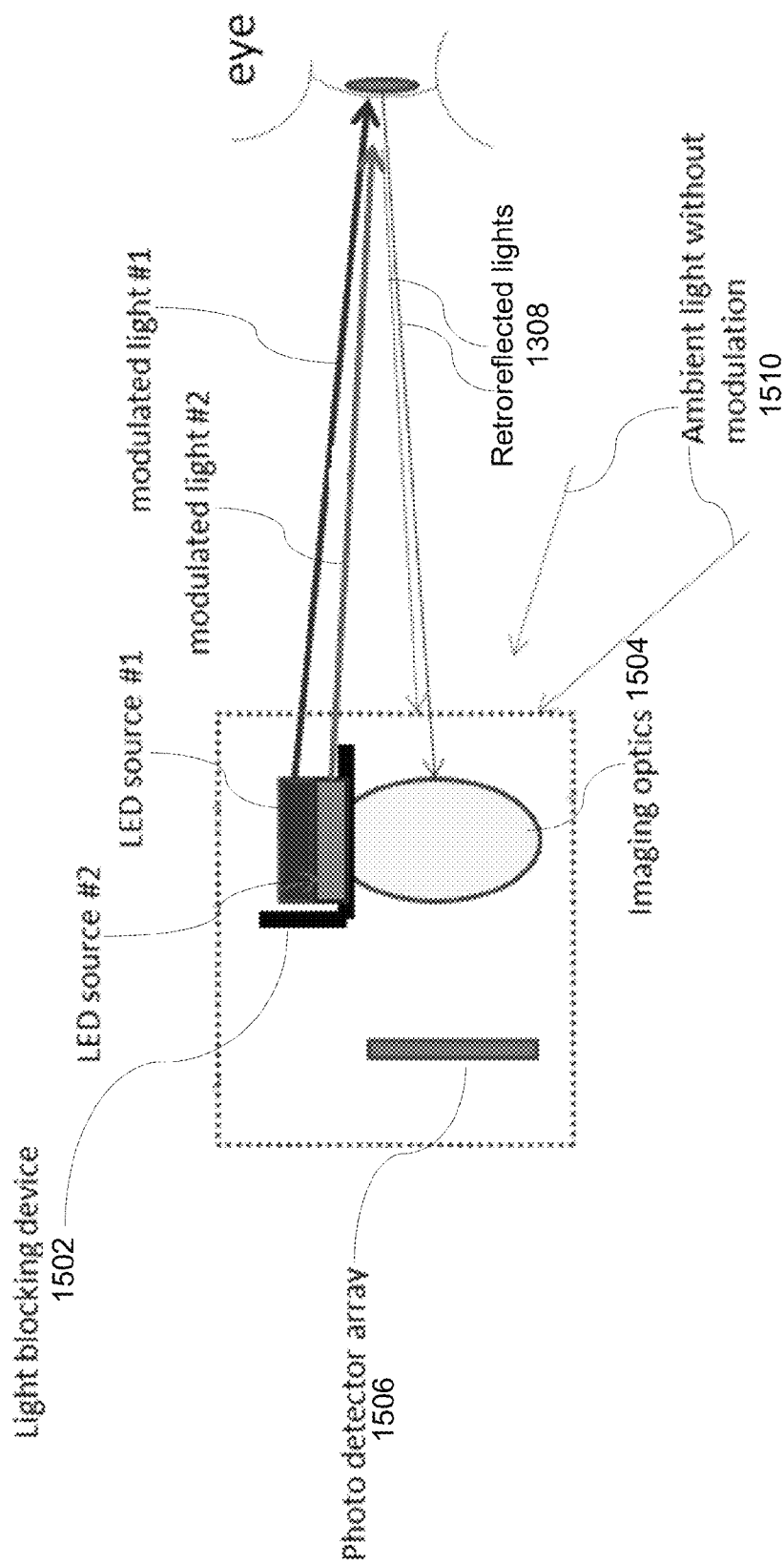
FIG. 15 shows a diagram of another exemplary eye-tracking sensor device of the disclosed technology using multiple modulated illumination light emitter and detection modules.

FIG. 15 shows a diagram of another exemplary eye-tracking sensor device of the disclosed technology using modulated illumination light and detection units. The exemplary eye-tracking sensor device of FIG. 15 can include multiple light sources (e.g., LED source #1 and LED source #2) to emit multiple modulated lights (e.g., modulated light #1 and modulated light #2) toward a user. The exemplary eye-tracking sensor device can include a light block device 1502 comprising one or more light blocking walls or barriers configured proximate the light sources to block light from the light sources from shining/illuminating on an image sensor of the exemplary eye-tracking sensor device. The exemplary eye-tracking sensor device can include imaging optics 1504 (e.g., one or more micro lens(es)) to receive and direct light into the eye-tracking sensor device. In some embodiments, imaging optics 1504 can be configured proximate the walls of light blocking device 1502 to prevent the emitted light from the multiple light sources from directly entering the imaging optics 1504. The exemplary eye-tracking sensor device can include a photodetector array 1506 to detect light transmitted through the imaging optics 1504. In some implementations of the exemplary eye-tracking sensor device, the multiple light sources are configured to emit multiple modulated light beams (e.g., at different modulated frequencies) that can be retroreflected from the eye and retroreflected lights 1508 can be received by the photodetector array 1506 via the imaging optics 1504 of the exemplary eye-tracking sensor device. The photodetector array 1506 can be configured to include pixels and a demodulation circuit coupled to the pixels to distinguish modulated light at the modulated frequencies emitted by the multiple light sources (e.g., LED source #1 and LED source #2) against other light without such modulation (e.g., such as ambient light 1510 in the surrounding environment). In some implementations, the exemplary eye-tracking sensor device can be communicatively coupled with a processing unit of a user device.

Figure 16:
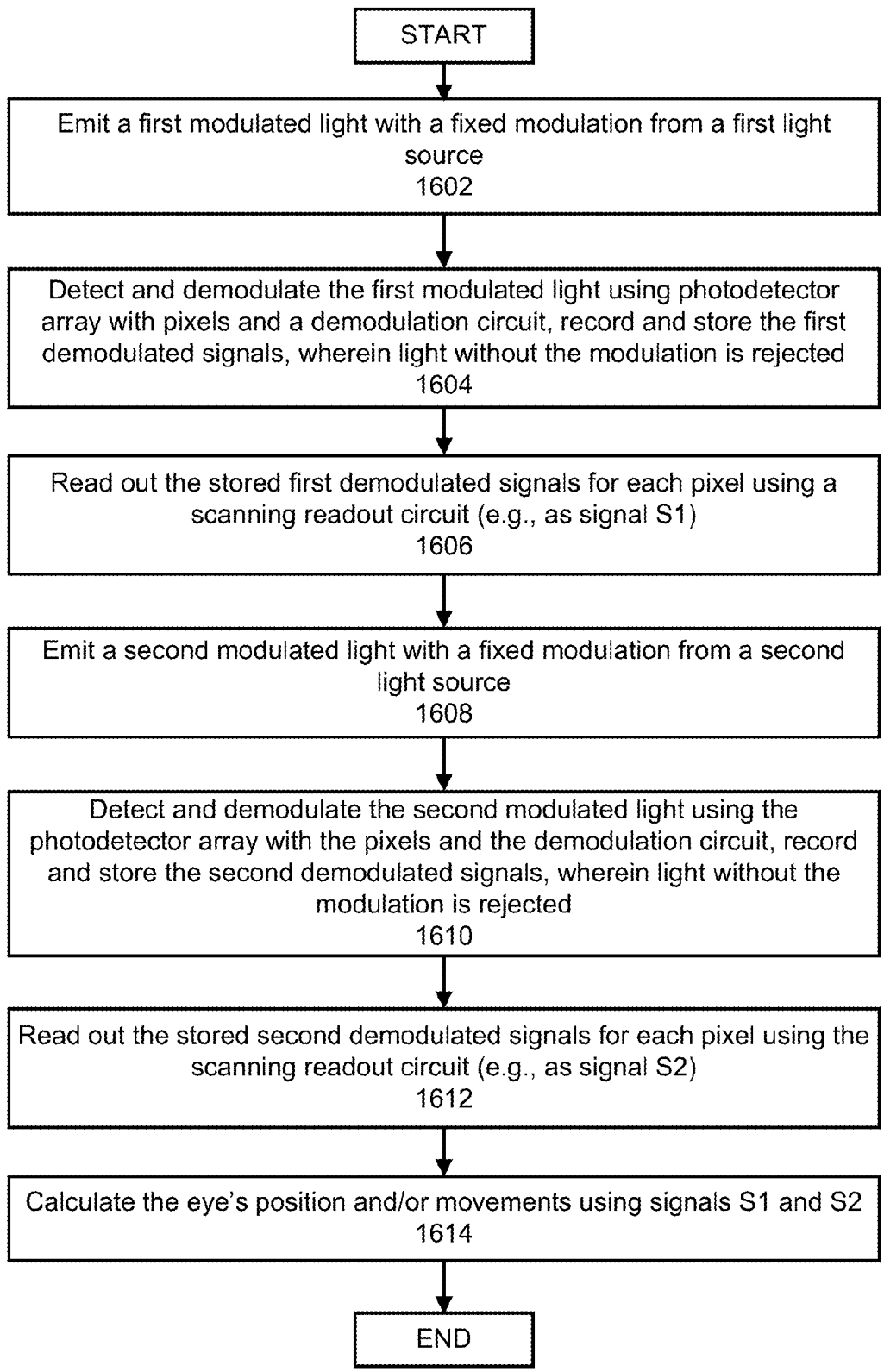
FIG. 16 shows a flowchart illustrating an exemplary process of detecting multiple modulated eye-tracking sensor signals.

FIG. 16 shows a flowchart illustrating an exemplary process of detecting multiple modulated eye-tracking sensor signals. The exemplary process can include a step to emit a first light (e.g., a LED light) with a fixed modulation from a first light emitting source (e.g., a LED light source) of an eye-tracking sensor device, e.g., the device described in FIG. 15 (Step 1602). The exemplary process can include a step to detect the first modulated light at a photodetector array including pixels and a demodulation circuit coupled to the pixels and to demodulate the detected first modulated light, so that the demodulated signals are recorded and stored (e.g., in a memory, which can be configured in the demodulation circuit), while lights without modulation are rejected (Step 1604). The process can include a step to read out the stored signals corresponding to the first modulated light for each pixel, e.g., using a scanning readout circuit coupled to or included in the demodulation circuit (Step 1606). The exemplary process can include a step to emit a second light (e.g., a LED light) with a fixed modulation from a second light emitting source (e.g., a LED light source) of the eye-tracking sensor device (Step 1608). The exemplary process can include a step to detect the second modulated light at the photodetector array including the pixel and the demodulation circuit and to demodulate the detected second modulated light, so that the demodulated signals are recorded and stored (e.g., in a memory, which can be configured in the demodulation circuit), while lights without modulation are rejected (Step 1610). The process can include a step to read out the stored signals corresponding to the second modulated light for each pixel, e.g., using the scanning readout circuit coupled to or included in the demodulation circuit (Step 1612). The process can include a step to use the first readout signals and the second readout signals to calculate the eye's position and/or moments (Step 1614). The process can also include implementing the emitting, detecting and demodulating, and read-out steps of the exemplary first and second modulated lights sequentially, as shown in FIG. 16, or concurrently, as shown in FIG. 17.

Figure 17:
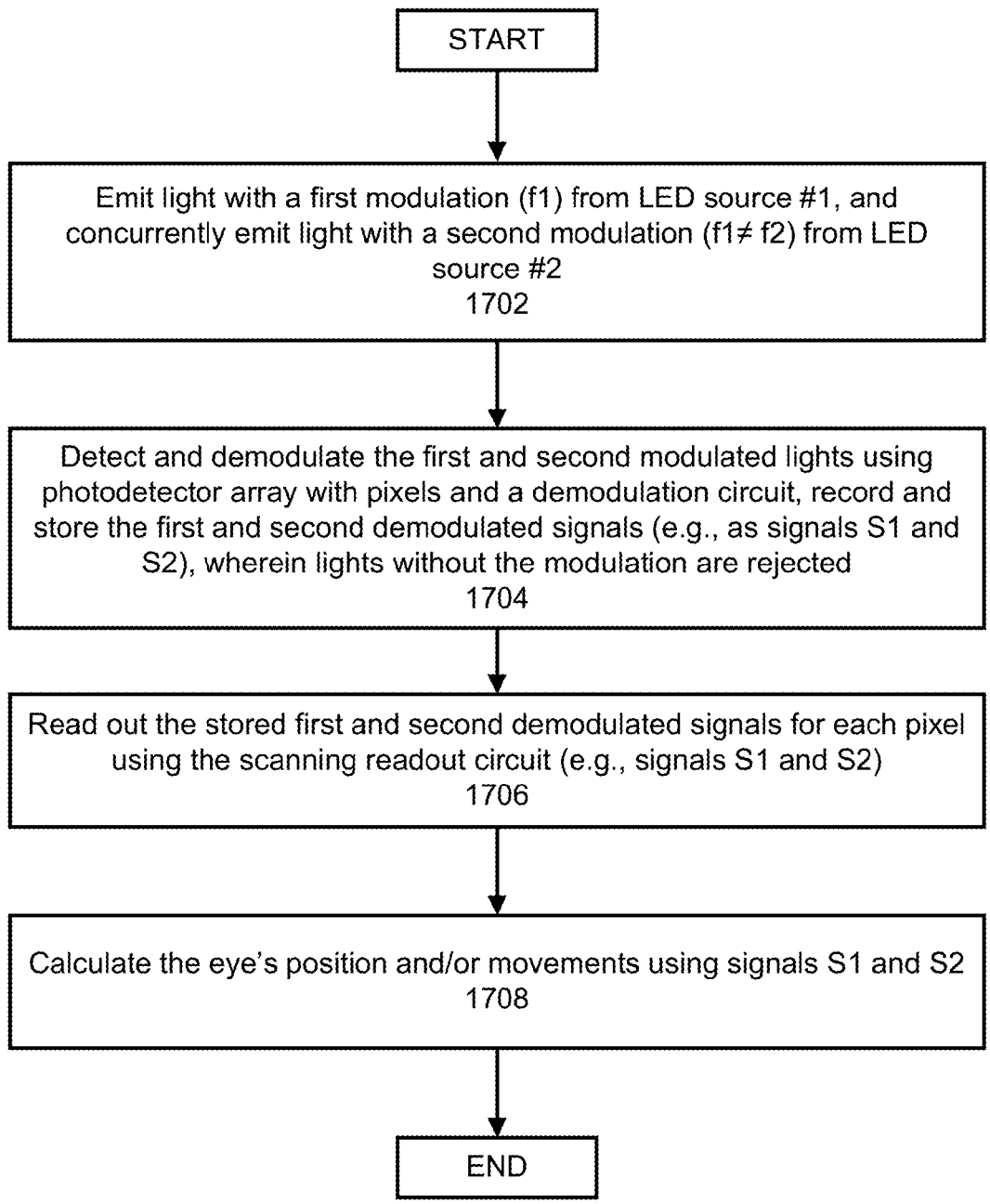
FIG. 17 shows a flowchart illustrating an exemplary process of concurrently detecting multiple modulated eye-tracking sensor signals.

FIG. 17 shows a flowchart illustrating an exemplary process of concurrently detecting multiple modulated eye-tracking sensor signals. The exemplary process can include a step to emit a first light (e.g., a LED light) with a first modulation from a first light emitting source (e.g., a LED light source #1) of an eye-tracking sensor device and concurrently to emit a second light (e.g., a LED light) with a second modulation different from the first modulation (e.g., at a different modulation frequency) from a second light emitting source (e.g., a LED light source #2) of the eye-tracking sensor device (Step 1702). The exemplary process can include a step to detect the first and second modulated lights at a photodetector array including pixels and a demodulation circuit coupled to the pixels and to demodulate the detected first and second modulated lights, record and store the two demodulated lights, while lights without modulation are rejected (Step 1704). The process can include a step to read out the stored signals corresponding to the first and second modulated lights for each pixel, e.g., using a scanning readout circuit coupled to or included in the demodulation circuit (Step 1706). The process can include a step to use the first readout signals and the second readout signals to calculate the eye's position and/or moments (Step 1708).

In one variation to the process of FIG. 17, two different light sources are used wherein the two light sources are different in wavelength. For example, the first light source emits light at wavelengths >850 nm (e.g., at 940 nm), and concurrently, the second light source emits light at wavelengths <850 nm (e.g., at 780 nm). The proposed exemplary wavelengths can be used because the human eye can have different absorption on the two different wavelengths, whereas the human skin and other backgrounds have little difference in response to these two wavelengths. The two light sources can be modulated with the same or different modulation frequencies. Using steps similar to those of FIG. 17, two demodulation signals (S1 and S2) are generated for the two light sources. By comparing the S1 and S2 signals, one can further reject the background signals. In other implementations, the two light sources can also be of the same wavelength and/or same modulation frequency but with a well-defined phase difference, such as a phase difference of π. In these implementations, the processor can also process and compare the two signals of different phases to extract information of the eye position or movement.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A device having an eye-tracking feature, comprising:
light sources disposed on an exterior structure of the device, the light sources operable to emit light;
a photodetector module on the exterior structure substantially equally spaced from each of the light sources, the photodetector module operable to receive light including at least partial retroreflected light from an eye of a user of the device based at least on the emitted light from the light sources to form an image;
a display screen on the exterior structure to display images to the user; and
a processor in communication with the light sources and the photodetector module, the processor to process information from the photodetector module to obtain differential values of the at least partial retroreflected light in the formed image responsive to the emitted light from the light sources and to determine a position of the eye gazing at the display screen based on the obtained differential values, wherein the processor operates to generate one or more images on the display screen as one or more location markers visible to the user to measure, based on information from the photodetector module, a position of the eye in viewing a selected marker included in the one or more location markers on the display screen to provide a calibration of the position of the eye on the display screen, wherein the calibration includes the user confirming via a user interface when the eye is looking at the selected marker.

2. The device as in claim 1, further comprising:
a memory unit communicatively coupled to the processor to store the determined position of the eye.

3. The device of claim 1, wherein the device includes a smartphone, a tablet, a picture or video camera, a computer monitor, or a laptop computer, and wherein the photodetector module includes a camera of the smartphone, tablet, picture or video camera, computer monitor, or laptop computer.

4. The device of claim 1, wherein the light sources are configured to emit colored light of different colors, different wavelengths, or different modulation frequencies.

5. The device of claim 1, wherein the light sources and the photodetector module are located on an edge of the device.

6. The device of claim 1, wherein the light sources emit infrared light.

7. The device of claim 1, wherein the light sources are configured to emit flashing light at a frequency correlated with a frame rate of the photodetector module.

8. The device of claim 1, wherein the light sources include LEDs.

9. The device of claim 1, wherein:
the processor is operable to use the determined position of the eye gazing at the display screen to provide a control to a user interaction at a positon on the display screen.

10. A method for tracking a movement of an eye in gazing at a display screen of a device, comprising:
using light sources arranged substantially equally spaced from a photodetector module of a device to emit light toward an eye of a user gazing at the display screen of the device, wherein the light sources are polarized by a polarizer;

receiving at the photodetector module at least partial retroreflections of the emitted light retroreflected from the eye;

filtering the received at least partially retroreflected light to reject background light and co-polarized light; and determining a positional parameter of the eye gazing at the display screen based at least on (1) differential values of the at least partial retroreflections corresponding to the light sources and (2) calibration information on a position of the eye gazing at the display screen based on measurements obtained from a calibration process that uses the differential values of the at least partial retroreflections corresponding to the light sources when displaying one or more visible location markers as images on the display screen to the user, wherein the measurements include determining, based on information from the photodetector module, the position of the eye in viewing a selected marker included in the one or more visible location markers on the display screen to provide a calibration of the position of the eye on the display screen, and wherein the calibration includes the user confirming via a user interface when the eye is looking at the selected marker.

11. The method of claim 10, wherein the filtering includes rejecting the background light using a bandpass filter and the co-polarized light using a polarizer.

12. The method of claim 10, wherein the light sources emit light of different colors.

13. The method of claim 12, wherein a color of the light is red, green, blue, or yellow.

14. The method of claim 10, wherein the light sources emit light of different wavelengths.

15. The method of claim 10, wherein the light sources emit light of different modulation frequencies.

16. The method of claim 10, wherein the emitted light includes infrared light.

17. The method of claim 10, wherein the emitted light includes flashing light at a frequency correlated with a frame rate of the photodetector module to further reject the background light.

18. The method of claim 10, further comprising:
using the at least partial retroreflections received at the photodetector module to detect blinking movements of the eye.

19. The method of claim 18, further comprising:
using the detected blinking movements as input data for at least one function of the device.

20. The method of claim 10, wherein the determining includes determining the positional parameter of the eye includes a direction in which the eye is looking or a location of the eye in space.

21. The method of claim 10, wherein using the light sources includes using the light sources substantially concurrently to emit the light.

22. The method of claim 10, wherein using the light sources to emit light and receiving the at least partial retroreflections at the photodetector module are performed substantially concurrently.

23. The method of claim 10, wherein using the light sources to emit light and receiving the retroreflections at the photodetector module are performed substantially sequentially including:
emitting a first light from a first light source of the light sources, capturing, using the photodetector module, a first image of the retroreflection of the first emitted light retroreflected by the eye in a first video frame, emitting a second light from a second light source of the light sources, capturing, using the photodetector module, a second image of the retroreflection of the second emitted light retroreflected by the eye in a second video frame, emitting a third light from a third light source of the light sources, and capturing, using the photodetector module, a third image of the retroreflection of the third emitted light retroreflected by the eye in a third video frame.

24. The method of claim 23, further comprising:
generating a data set based on the first, second, and third video frames.

25. The method of claim 10, further comprising:
using the determined positional parameter of the movement of the eye gazing at the display screen to provide a control to a user interaction at a positon on the display screen associated with the determined positional parameter.

26. A portable device having an eye-tracking feature for tracking a location of gaze of a user's eye on a display screen of the portable device, comprising:
a display screen;
a surface adjacent to the display screen;
light sources disposed on the surface and the light sources operable to emit light;
a photodetector module on the surface substantially equally spaced from each of the light sources, the photodetector module operable to receive light including at least partial retroreflected light from an eye of a user of the device gazing at the display screen based at least on the emitted light from the light sources and to form an image; and
a processor in communication with the light sources and the photodetector module, the processor to process information from the photodetector module to obtain differential values of the at least partial retroreflected light in the formed image responsive to the emitted light from the light sources and to determine a position or a movement of the eye gazing at the display screen based on the obtained differential values, wherein the processor operates to generate one or more images on the display screen as one or more location markers visible to the user to measure, based on information from the photodetector module, a position of the eye in viewing a selected marker included in the one or more location markers on the display screen to provide a calibration of the position of the eye on the display screen, wherein the calibration includes the user confirming via a user interface when the eye is looking at the selected marker.

27. The device as in claim 26, wherein the processor is configured to use the determined position or movement of the eye to trigger an operation that causes an indicator to be displayed on the display screen.

28. The device as in claim 27, wherein the processor is further configured to use different determined positions or movements of the eye to trigger different operations, respectively.

29. The device of claim 26, wherein:
the processor is operable to use the determined position or movement of the eye gazing at the display screen to provide a control to a user interaction at a positon on the display screen.

30. A method for tracking the movement of an eye gazing at a display screen, comprising:

using a light source configured in a user device having a display screen, emitting light modulated at a particular frequency or frequencies toward an eye of a user while display images on the display screen to the user, wherein the emitted light is polarized by a polarizer;

using a photodetector module configured in the user device, detecting retroreflected light from at least one eye of the user, wherein the detecting includes:

receiving at least a partial retroreflection of the emitted light retroreflected from one or both of the left and the right eye of the user, filtering the received retroreflected light to reject the background light, and demodulating the filtered light to separate retroreflected light of the modulation frequency or frequencies from light not of the modulation frequency or frequencies; and determining a positional parameter of the eye gazing at the display screen based on (1) differential values of the demodulated retroreflections and (2) calibration information on a position of the eye gazing at the display screen based on measurements obtained from a calibration process that uses the differential values of the at least partial retroreflections corresponding to the light sources when display one or more visible location markers as images on the display screen to the user, wherein the measurements include determining, based on information from the photodetector module, the position of the eye in viewing a selected marker included in the one or more visible location markers on the display screen to provide a calibration of the position of the eye on the display screen, and wherein the calibration includes the user confirming via a user interface when the eye is looking at the selected marker.

31. The method of claim 30, wherein the light source wavelength, such as 700-850 nm, has strong retroreflection from the eye.

32. The method of claim 30, wherein light source emits multiple light beams using multiple light sources, the multiple light beams of different wavelengths or of different modulation frequencies or different phases.

33. The method of claim 32, wherein some of the light is emitted at wavelengths including 700-850 nm to have strong retroreflection from the eye, and other of the light is emitted at wavelengths including 920-1020 nm to have weak or no retroreflection from the eye.

34. The method of claim 32, wherein some of the light is modulated at phase zero, and other of the light is modulated at phase shifted about π.

35. The method of claim 32, wherein the multiple light sources and the photodetector module are located on an edge of the user device.

36. The method of claim 35, wherein the multiple light sources and the photodetector module are configured at a distance on the user device within a dimension of a pupil diameter size including 2 to 8 mm.

37. The method of claim 30, wherein the emitted light includes one or both of visible and infrared light.

38. The method of claim 30, wherein the emitted light includes flashing light at a frequency correlated with a frame rate of the photodetector module to further reject the background light.

39. The method of claim 30, further comprising:

using the at least partial retroreflections received at the photodetector module to detect blinking movements of the eye.

40. The method of claim 39, further comprising:

using the detect blinking movements as input data for at least one function of the device.

41. The method of claim 30, wherein the user device is a smartphone, a tablet, a picture or video camera, a computer monitor, or a laptop computer.

42. The method of claim 30, wherein the positional parameter of the eye includes a direction in which the eye is looking or a location of the eye in space.

43. The method of claim 30, wherein the emitted modulated light is emitted by multiple light sources concurrently.

44. The method of claim 43, wherein the emitting the light using the multiple light sources and the receiving the retroreflection at the photodetector module is implemented concurrently.

45. The method of claim 30, wherein the emitting the light includes using multiple light sources to emit modulated light at different frequencies, and the receiving the at least partial retroreflection at the photodetector module is implemented sequentially, wherein the method includes:

emitting a first light from a first group light sources which wavelengths are configured to strong retroreflection by the eye at wavelengths including 700-850 nm, capturing, using the photodetector module, a first image of the retroreflection of the first emitted light retroreflected by the eye in a first video frame, emitting a second light from the second group light sources which wavelengths have weak or no retroreflection by the eye at wavelengths including 920-1020 nm, capturing, using the photodetector module, a second image of the retroreflection of the second emitted light retroreflected by the eye in a second video frame, and calculating the differential between the video frames, based on the differential, selecting an eye retroreflection signal from background scattering.

46. The method of claim 45, further comprising:

grouping the first and second video frames in a data set.

47. The method of claim 45, wherein the first and second video frames are captured simultaneously when the two group of light sources are modulated at different frequencies.

48. The method of claim 30, wherein the emitting the light using the light source and the receiving the retroreflection at the photodetector module is implemented concurrently.

49. The method of claim 30, wherein the emitting the light using the light source and the receiving the retroreflection at the photodetector module is implemented sequentially, wherein the method includes:

capturing, using the photodetector module, a first image of the retroreflection of the first emitted light retroreflected by the eye in a first video frame, capturing, using the photodetector module, a second image of the retroreflection of the second emitted light retroreflected by the eye in a second video frame, comparing, among image pixels of the photodetector module, the first and the second image to determine a position of the eye.

50. The method of claim 49, further comprising:

grouping the first and second video frames in a data set.

51. The method of claim 49, wherein nearby frames are compared to determine differential images to determine the position of the eye.

52. The method of claim 30, further comprising:
using the determined positional parameter of the movement of the eye gazing at the display screen to provide a control to a user interaction at a positon on the display screen associated with the determined positional parameter.

53. A method for tracking the movement of an eye gazing at a display screen of a device, comprising:
using a set of light sources positioned around a photodetector module of a device to emit light toward an eye of a user when displaying images on a display screen of the device to the user, wherein the set of light sources are configured such that a given light source in the set of light sources is distinguishable from other light sources in the set of light sources;
receiving at the photodetector module a combined retroreflection of the light retroreflected from the eye corresponding to the set of light sources;
distinguishing the combined retroreflection to determine a separate retroreflection component corresponding to each of the set of light sources using the photodetector module; and
determining a positional parameter of the movement of the eye gazing at the display screen based on (1) differential values of the separated retroreflections corresponding to the set of light sources and (2) calibration information on a position of the eye gazing at the display screen based on measurements obtained from a calibration process that uses the differential values of the at least partial retroreflections corresponding to the light sources when display one or more visible location markers as images on the display screen to the user, wherein the measurements include determining, based on information from the photodetector module, the position of the eye in viewing a selected marker included in the one or more visible location markers on the display screen to provide a calibration of the position of the eye on the display screen, and wherein the calibration includes the user confirming via a user interface when the eye is looking at the selected marker.

54. The method of claim 53, wherein the set of light sources includes at least three light sources.

55. The method of claim 53, wherein the set of light sources are positioned around the photodetector module with positional offsets to achieve differential values of the separated retroreflections in both an x-direction and a y-direction.

56. The method of claim 53, wherein the set of light sources are distinguishable from each other according to the emission colors, wherein each of the set of light sources emits a light at a wavelength different from wavelengths of other light sources in the set of light sources.

57. The method of claim 53, wherein each of the set of light sources emits an intensity modulated light, and wherein the set of light sources emit the intensity modulated lights at different modulation frequencies.

58. The method of claim 57, wherein the set of light sources emit light at the same wavelength but different modulation frequencies.

59. The method of claim 53, wherein a given light source in the set of light sources emits a light having a combination of a wavelength and a modulation frequency which is different from combinations of wavelength and modulation frequency of other light sources in the set of light sources.

60. The method of claim 53, wherein the photodetector module receives the combined retroreflection of the light retroreflected from the eye corresponding to the set of light sources at the same time.

61. The method of claim 53, further comprising:
using the determined positional parameter of the movement of the eye gazing at the display screen to provide a control to a user interaction at a positon on the display screen associated with the determined positional parameter.

* * * * *